US012808233B2

(12) United States Patent
Fischer

(10) Patent No.: US 12,808,233 B2
(45) Date of Patent: Nov. 24, 2026

(54) APPARATUS FOR BARRICADING A DOOR HAVING ELECTRONIC MONITORING CAPABILITY

(71) Applicant: Gary Fischer, Houston, TX (US)

(72) Inventor: Gary Fischer, Houston, TX (US)

( * ) Notice: Subject to any disclaimer, the term of this patent is extended or adjusted under 35 U.S.C. 154(b) by 0 days.

(21) Appl. No.: 18/800,653

(22) Filed: Aug. 12, 2024

(65) Prior Publication Data

US 2025/0084670 A1 Mar. 13, 2025

Related U.S. Application Data

(60) Provisional application No. 63/582,195, filed on Sep. 12, 2023.

(51) Int. Cl.
*E05B 65/10* (2006.01)
*G07C 9/00* (2020.01)

(52) U.S. Cl.
CPC ...... *E05B 65/1013* (2013.01); *G07C 9/00309* (2013.01); *G07C 2009/00793* (2013.01)

(58) Field of Classification Search
CPC ............ E05B 65/1013; G07C 9/00309; G07C 2009/00793
USPC ........................................................ 292/92
See application file for complete search history.

(56) References Cited

U.S. PATENT DOCUMENTS 1,061,269 A * 5/1913 Coffin .................... E05F 11/00 292/194
1,082,432 A * 12/1913 Mertsheimer ........... E05B 5/003 292/288
1,808,393 A * 6/1931 Wecker ................. E05C 17/443 292/338
1,944,382 A * 1/1934 Wecker .................. E05B 63/20 292/171

(Continued)

FOREIGN PATENT DOCUMENTS

CN 104954424 A * 9/2015 ............ H04L 67/56
DE 202013004894 9/2013

(Continued)

OTHER PUBLICATIONS

Bolo Stick Door Barricade Installation Guide, retrieved on Jun. 8, 2020 from <https://bolostick.com/bolo-stick-installation-guide>.

(Continued)

*Primary Examiner* — Nathan Cumar
(74) *Attorney, Agent, or Firm* — Lewis & Reese, PLLC

(57) ABSTRACT

A system to barricade a door from forced entry. The system includes a lower portion that preferably fits within a receptacle that is recessed into the floor when the anchor is deployed. The system can include electronics and communication circuitry to allow deployment of the system to be monitored by a monitoring system, which may be incorporated into an insert affixable to the system. The communication circuitry is configured to send a message, which can include identifying information and an indication of deploy- (Continued)

ment, to the monitoring system, and may also be configured to receive and indicate alerts from the monitoring system. A Graphical User Interface at a monitoring computer in the monitoring system can display information about system deployment at a site being monitored, which may include a number of potentially deployable systems.

20 Claims, 19 Drawing Sheets

(56) References Cited

U.S. PATENT DOCUMENTS 2,553,732 A * 5/1951 Young .................... E05C 17/54 269/208
2,568,477 A * 9/1951 Westlund ................ E05C 17/44 49/470
D167,938 S * 10/1952 Grindstad
4,050,723 A * 9/1977 Papadatos ............ E05C 17/446 292/164
4,178,026 A * 12/1979 Sinkhorn ................ E05C 19/18 292/288
4,198,088 A * 4/1980 Tochihara ............... E05C 19/18 292/288
D272,041 S * 1/1984 Harris
4,585,259 A * 4/1986 Vidas ...................... E05C 17/54 292/339
5,226,201 A * 7/1993 Lefebvre ................. E05C 17/52 292/87
5,383,254 A * 1/1995 Wigley, Sr. ......... E05B 65/0894 16/82
5,398,982 A * 3/1995 Watson, Jr. ............. E05C 3/048 292/259 R
5,454,143 A * 10/1995 Wigley, Sr. ............. E05C 19/18 16/82
5,454,610 A * 10/1995 Taylor ..................... E05C 17/54 292/339
5,458,383 A * 10/1995 Gunn .................... E05B 67/383 292/148
5,489,129 A * 2/1996 Shepherd ................ E05C 19/18 292/67
5,490,304 A * 2/1996 Winner, Jr. ............... E05F 5/06 16/82
5,590,918 A * 1/1997 Kambalov ............ E05C 19/184 16/82
5,601,319 A * 2/1997 Morin ................... E05C 17/443 292/339
5,727,822 A * 3/1998 Truong ................... E05C 17/46 292/202
5,799,367 A * 9/1998 Simon ....................... E05F 5/06 292/DIG. 19
5,904,325 A * 5/1999 Hung ........................ F16L 3/04 248/74.1
5,983,680 A * 11/1999 Del Nin .................... E05C 9/10 70/93
6,345,849 B1 * 2/2002 Yen ......................... E05C 17/54 292/342
6,378,917 B1 * 4/2002 Jones .................... E05C 19/184 292/53
6,471,264 B1 * 10/2002 Ryan ......................... E05C 1/04 292/262
6,557,912 B1 * 5/2003 Truong ................... E05C 17/50 292/342
6,629,335 B1 * 10/2003 Derman .................... E05F 5/06 292/DIG. 60
6,708,625 B1 * 3/2004 Burke ..................... E05B 83/06 292/168
7,021,678 B1 * 4/2006 Raoult ................. A01K 1/0017 292/341.15
7,201,408 B2 * 4/2007 Cennamo, Jr. .......... E05B 15/02 292/334
7,367,596 B2 * 5/2008 Leung ................... E05B 67/383 292/281
D602,339 S * 10/2009 Frankel
7,651,140 B2 * 1/2010 Leggio ...................... E05C 1/04 292/342
D612,717 S * 3/2010 Frankel
D623,499 S * 9/2010 Tien
D656,386 S * 3/2012 Shen
8,690,201 B2 * 4/2014 Frazier ...................... E05C 1/04 256/73
8,708,378 B2 * 4/2014 Frazier ...................... E05C 5/02 292/281
D717,641 S * 11/2014 Hugo
8,894,110 B2 * 11/2014 Taylor ................... E05C 19/184 292/288
D722,495 S * 2/2015 Hugo
D733,520 S * 7/2015 Barna
9,121,203 B2 * 9/2015 Muramatsu ............. E05B 77/36
9,127,489 B2 * 9/2015 Orlov ....................... E05C 17/54
9,238,926 B2 * 1/2016 Guerrero ............. E05B 17/2076
9,388,620 B2 * 7/2016 Endo ....................... E05C 17/52
9,435,147 B1 * 9/2016 Giandomenico, Jr. ..................... E05B 19/20
9,518,421 B2 12/2016 Cushwa, Jr. et al.
9,534,430 B2 * 1/2017 Taylor ................... E05C 19/184
9,562,377 B2 * 2/2017 Attard ................... E05B 67/383
9,598,885 B2 * 3/2017 Yamamoto ................ E05F 5/06
9,799,181 B2 * 10/2017 Cushwa, Jr. ........... G08B 13/08
9,856,682 B1 * 1/2018 Cook ...................... E05C 19/18
9,863,172 B2 * 1/2018 Burke .................. B61D 19/001
D813,642 S * 3/2018 Tyus
9,957,741 B2 5/2018 Taylor et al.
10,094,154 B2 * 10/2018 Ploskunak ............ E05C 19/184
10,131,318 B2 * 11/2018 Davis ................. G08B 21/0225
10,174,532 B2 * 1/2019 Couturier ............. E05C 19/184
10,214,948 B2 2/2019 Richmond
10,316,556 B2 * 6/2019 Richmond .............. E05C 21/00
D853,832 S * 7/2019 Cheever .................. E05C 17/54
10,422,181 B2 * 9/2019 Leavitt .................... E06B 9/522
11,441,333 B2 * 9/2022 Tagtow .............. G07C 9/00174
11,605,254 B1 * 3/2023 Musabeyoglu .... G06K 7/10297
2008/0216524 A1 * 9/2008 Abdelazeem ........... E05B 83/10 70/91
2009/0058104 A1 * 3/2009 Huang .................... E05C 17/00 292/288
2009/0134640 A1 * 5/2009 Ruffino ................. E05C 19/184 292/338
2009/0263754 A1 * 10/2009 Wang ...................... F23Q 2/287 431/153
2011/0291426 A1 * 12/2011 Gibson ................. E05C 19/188 292/137
2014/0159384 A1 6/2014 Frazier
2014/0312634 A1 * 10/2014 Cushwa, Jr. .............. E06B 9/02 292/340
2015/0000354 A1 * 1/2015 Orlov ...................... E05C 17/54 70/14
2015/0076844 A1 3/2015 Taylor et al.
2015/0376923 A1 * 12/2015 Presutti ...................... E05C 9/10 292/259 R
2016/0230431 A1 * 8/2016 Yonekura .............. E05C 19/188
2016/0284178 A1 * 9/2016 Cushwa, Jr. ........... G08B 13/08
2017/0211301 A1 * 7/2017 Richmond .............. E05B 63/18
2018/0238085 A1 * 8/2018 Richmond ................ E05C 5/02
2018/0371810 A1 * 12/2018 Howard .................... E05C 1/04
2019/0003221 A1 * 1/2019 Taylor ................... E05C 19/004
2019/0284853 A1 * 9/2019 Geenens ................. E05B 45/06
2020/0063475 A1 * 2/2020 Seelbinder ............... G08B 5/36
2021/0388652 A1 12/2021 Fischer
2021/0388653 A1 * 12/2021 Fischer ................... E05B 15/10
2022/0383677 A1 * 12/2022 Klink ................. G07C 9/00182

FOREIGN PATENT DOCUMENTS

DE 102013110887 4/2015
EP 3922795 A1 * 12/2021 ........... E05C 19/003

(56) References Cited

FOREIGN PATENT DOCUMENTS

| | | | | |
|---|---|---|---|---|
| GB | 2030639 | | | 4/1980 |
| JP | 2016048023 | A | * | 4/2016 |

OTHER PUBLICATIONS

DoorJammer: Lockdown Product Information, retrieved on Jun. 8, 2020 from <https://door-jammer.com/doorjammer-lockdown/>.
DoorJammer: Portable Product Information, retrieved on Jun. 8, 2020 from <https://door-jammer.com/doorjammer-portable/>.
Fire Door Armor Product Sheet, Fire Door Solutions, retrieved on Jun. 8, 2020 from <https://firedoorarmor.com/>.
Nightlock® Lockdown 1 | Nightlock Door Security Devices, retrieved on Jun. 8, 2020 from <https://nightlock.com/door-security-devices/door-barricade/nightlock-lockdown>.
OnGUARD Security Door Brace | Door Barricade | Prevents Home Invasions, Burglaries & looters | OnGARD Withstands up to 3000 Lbs of Violent Force | On Guard, retrieved on Jun. 9, 2020 from <https://www.amazon.com/Invasions-Burglars-OnGARD-Withstands-Nightlock/dp/B0044EF1GQ>.
The Anchor Product Sheet, Anchorman Inc., retrieved on Jun. 8, 2020 from <www.anchormaninc.com>.
Brochure for Active Defender App (date unknown). Further details available at active-defender.com.

* cited by examiner

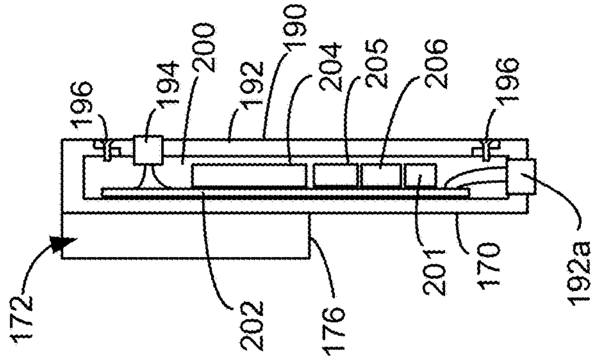
Figure 13
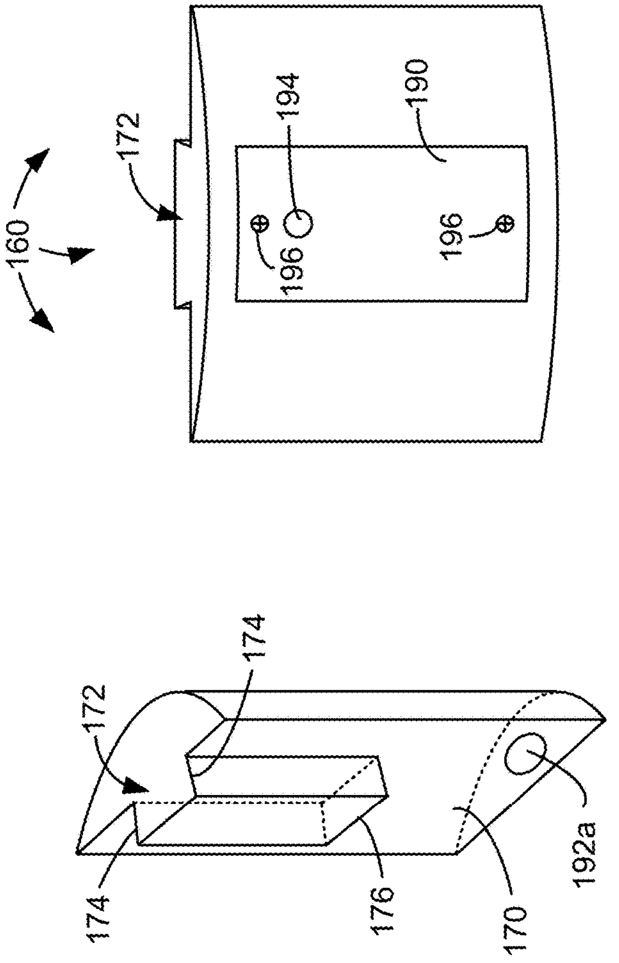
Figure 12
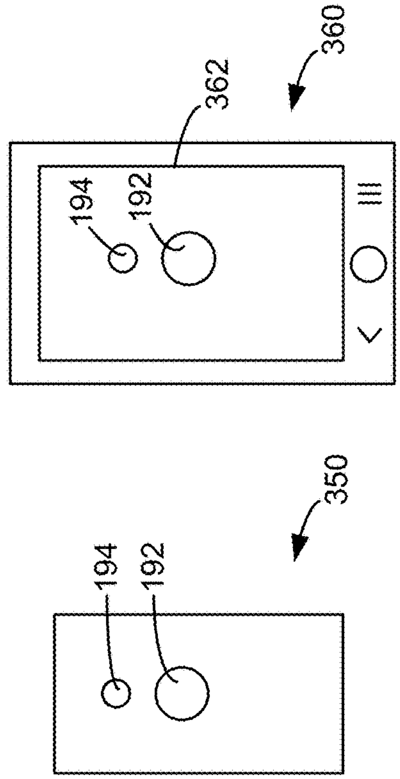

Single inward swinging door

Single outward swinging door

APPARATUS FOR BARRICADING A DOOR HAVING ELECTRONIC MONITORING CAPABILITY

CROSS REFERENCE TO RELATED APPLICATIONS

This is a non-provisional application of U.S. Provisional Patent Application Ser. No. 63/582,195, filed Sep. 12, 2023, which is incorporated herein by reference in its entirety, and to which priority is claimed.

FIELD OF THE INVENTION

This application relates to systems for barricading a door, such as is useful in preventing forced entry into a dwelling or business.

INTRODUCTION

Various physical security measures can be used with doors at a dwelling or business that are designed to discourage forced entry into the premises. FIG. 1 shows a door 10, which is typically attached to a frame 12 by hinges 14. FIG. 1 shows various devices that have been used to provide physical door security, which are typically accessible to a user from inside the building being secured. These security measures are well known, and hence only briefly explained. In this example, the door 10 is inward swinging and hinged to allow it to pivot into a building when the door is opened, as is typical when the building comprises a residence. However, a door 10 may also be outward swinging.

Element 20 comprises a latch which includes portions mounted (typically using screws) to both the door 10 and the frame 12 (or an adjacent wall more generally). The portion of the latch 20 affixed to the door 10 includes a slidable latch 22, which a user can slide to meet with a loop 24 on the portion affixed to the frame 12. Element 30 comprises a chain latch, which is generally similar to latch 20, although in this latch 30 the portion affixed to the door includes a chain 32 with a bit at its end. A user can position the bit within a slot 34 on the portion affixed to the frame 12. In either of latches 20 or 30, security against forced entry is provided by the sliding latch 22 or the chain 32. However, such security is not perfect. A force provided outside the door such as from an assailant wishing forced entry can cause latches 20 or 30 to fail. Particularly, a sufficient force to the door 10—such as a force pushing the door inwards—can cause the sliding latch 22 or chain 32 to break, or can cause the screws affixing the devices 20 or 30 to become dislodged from either the door 10 or the frame 12.

Element 40 comprises a well-known door knob. When the knob is turned, a latch 44 is retracted into the door 10 from a recess 46 that has been morticed into the frame 12, thus allowing the door to be opened. When not turned, or when locked such as by using a key (not shown) or thumb turn 42, the latch 44 will remain extended in the recess 46, thus providing physical security against forced entry via force provided by the latch 44 against the door frame 12. Element 50 is typically called a "dead bolt." Like knob 40, dead bolt 50 includes a latch 54 which can be retracted from or extended into a recess 56 provided in the door frame 12, again using a key or a thumb turn 52. Door knobs 40 and dead bolts 50 also do not provide complete security against forced entry. In both cases, a sufficient outside force on the door 10 can cause the door knob 40 or dead bolt 50 to fail. Particularly, the recesses 46 or 56 morticed into the door frame 12 reduce the door frame material, thus weakening the material against external forces, raising the possibility that the latches 44 or 54 will break through the recesses 46 or 56. A strike plate (not shown) can be affixed (screwed) to the frame 12 over the recesses which will add further structural integrity against external forces, but such protection is limited by the strength of the screws involved.

Element 60 comprises another form of a door latch. In this example, a portion 64 is affixed to, or within, the door 10, which includes a sliding latch 66. This latch 66 can slide into a hole 68 morticed in the floor 70. The sliding latch 66 may be controlled by a key or thumb turn 62. Like latches 20 and 30 however, latch 60 can be prone to failure. A sufficient force outside the door 10 can cause the portion 64 affixed to the door 10 to become dislodged, or the latch 66 to be broken.

SUMMARY

A door barricading system is disclosed, which may comprise: a lower portion configured to be slid into a receptacle mountable in a floor inside at least one door to be barricaded; an upper portion connected to the lower portion, wherein the upper portion is configured to either (i) contact the at least one door to prevent the at least one door from swinging inwards, or (ii) connect to at least one door bracket affixed to the at least one door to prevent the at least one door from swinging outwards; and an insert removably affixable to the upper portion, wherein the insert includes electronic circuitry configured to wirelessly communicate with a monitoring system.

In one example, the upper portion comprises a first key, and wherein the insert comprises a second key removeable affixable to the first key. In one example, the second key is removeable affixable to the first key via a vertical sliding motion. In one example, the first and second key have horizontal bottom edges that are brought into contact by the vertical sliding motion. In one example, the first and second keys are shaped to prevent horizontal movement of the insert away from the upper portion when the first and second keys are affixed. In one example, the first key comprises a tab or slot, and wherein the second key comprises the other of the tab or slot. In one example, the insert comprises a housing for the electronic circuitry comprising a dielectric material. In one example, the upper portion comprises a metal material. In one example, the electronic circuitry is configured to wirelessly transmit a message to the monitoring system indicating that the system has been deployed to barricade the at least one door. In one example, the message is transmitted periodically. In one example, the message comprises an identification number for the system. In one example, the insert comprises a switch, wherein the electronic circuitry is configured to transmit the message when the switch is depressed. In one example, the switch is configured to be depressible by a user upon deploying the system. In one example, the switch is configured to be automatically depressed when the system is deployed. In one example, the electronic circuitry is configured to automatically transmit the message when the system is deployed. In one example, the insert further comprises a visual indicator configured to indicate when the message is being transmitted. In one example, the electronic circuitry is further configured to receive an alert from the monitoring system. In one example, the electronic circuitry is configured to wirelessly receive an alert from the monitoring system. In one example, the insert comprises a user interface to indicate the alert to a user. In one example, the upper portion is a cylindrical shape, and wherein the insert comprises a curved surface to match the cylindrical shape when the insert is affixed to the upper portion. In one example, the upper portion comprises a first portion and an extension removably affixable to the first portion, wherein the extension is configured to contact the at least one door to prevent the at least one door from swinging inwards. In one example, the upper portion a third key configured to connect to a fourth key on the at least one door bracket.

A system is disclosed, which may comprise: at least one door barricading system, wherein each door barricading system comprises wireless communication circuitry configured to wirelessly transmit a message indicating that that system has been deployed to barricade at least one door; and a computer-readable medium comprising instructions for an application configured to render a graphical user interface (GUI) on a computing device, wherein the application is configured to cause the computing device to wirelessly receive the message from each at least one door barricading system, wherein the GUI is configured to display an indication whether or not each of the at least one door barricading systems has been deployed in accordance with each of the received messages.

In one example, the computing device is configured to wirelessly receive the message from each at least one door barricading system periodically. In one example, the message received from each at least one door barricading system comprises an identification number for each system. In one example, the at least one door barricading systems are deployable at a site, and wherein the GUI displays a map of the site with the indication. In one example, the indication comprises an identification number for each deployed door barricading system. In one example, the indication comprises a color or shading on the map. In one example, the GUI is configured to receive an input to define an alert, and wherein the application is further configured to cause the computing device to wirelessly transmit the alert. In one example, the wireless communication circuitry in each at least one door barricading system is configured to wirelessly receive the alert. In one example, the GUI is configured to receive an input to select the at least one door barricading system to which the alert is to be transmitted. In one example, each at least one door barricading system comprises a user interface, and wherein the user interface is configured to output the alert. In one example, the application comprises contact information associated with each at least one door barricading system, and wherein the application is further configured to cause the computing device to wirelessly transmit the alert using the contact information. In one example, the alert comprises textual or audible information. In one example, the contact information comprises an email address or a phone number. In one example, each at least one door barricading system comprises: a lower portion configured when deployed to be slid into a receptacle mountable in a floor inside the at least one door to be barricaded; an upper portion connected to the lower portion, wherein the upper portion is configured to either (i) contact the at least one door to prevent the at least one door from swinging inwards, or (ii) connect to at least one door bracket affixed to the at least one door to prevent the at least one door from swinging outwards. In one example, the wireless communication circuitry of each at least one door barricading system is housed in the upper portion. In one example, the wireless communication circuitry of each at least one door barricading system is housed within an insert removably affixable to the upper portion. In one example, the wireless communication circuitry of each door barricading system is physically integrated with portions of the system that barricade the at least one door. In one example, the wireless communication circuitry of each door barricading system is not physically integrated with portions of the system that barricade the at least one door. In one example, the system further comprises the computing device. In one example, the computing device comprises a portable computing device.

A door barricading system is disclosed that is configurable to barricade at least one door that is either inward swinging or outward swinging, which may comprise: a lower portion configured to be slid into a receptacle mountable in a floor inside at least one door to be barricaded; an upper portion connected to the lower portion; and a plurality of components removably affixable to the upper portion, wherein a first subset of one or more of the plurality of components are affixed to the upper portion to configure the system to contact the at least one door to prevent the at least one door from swinging inwards, wherein the upper portion is configured to connect to a door bracket affixed to the at least one door to prevent the at least one door from swinging outwards.

In one example, the upper portion includes first and second keys. In one example, the first key comprises a slot or a tab, and wherein the second key comprises the other of the slot or the tab. In one example, the upper portion includes a first key, and wherein a component in the first subset comprises a second key removably affixable to the first key. In one example, the first key comprises a slot or a tab, and wherein the second key comprises the other of the slot or the tab. In one example, a component in the first subset comprises an insert, wherein the insert includes electronic circuitry configured to wirelessly communicate with a monitoring system. In one example, a component in the first subset comprises a bumper. In one example, the bumper includes a flat vertical surface. In one example, the flat vertical surface is configured to contact the at least one door to prevent the at least one door from swinging inwards. In one example, a component in the first subset comprises an extension, wherein the extension is configured to contact the at least one door to prevent the at least one door from swinging inwards. In one example, a component in the first subset comprises an inward-swinging plate, wherein the inward-swinging plate is configured to contact two doors to prevent the two doors from swinging inwards. In one example, a second subset of one or more of the plurality of components are affixed to the upper portion to configure the system to connect to at least one door bracket affixed to the at least one door to prevent the at least one door from swinging outwards. In one example, the upper portion includes a first key, and wherein a component in the second subset comprises a second key removably affixable to the first key. In one example, the first key comprises a slot or a tab, and wherein the second key comprises the other of the slot or the tab. In one example, a component in the second subset comprises an insert, wherein the insert includes electronic circuitry configured to wirelessly communicate with a monitoring system. In one example, a component in the second subset comprises a bumper. In one example, the bumper includes a flat vertical surface. In one example, a component in the second subset comprises an outward-swinging plate, wherein the outward-swinging plate is configured to connect to two door brackets affixed to two doors to prevent the two doors from swinging outwards. In one example, the outward swinging plate comprises two first keys. In one example, each of the two door brackets comprises a second key, wherein each of the first keys is configured to removably affix to the second key on one of the two door brackets.

BRIEF DESCRIPTION OF THE DRAWINGS

FIG. 12 shows a modification in which the insert or extension has a pressure switch to automictically detect when the system has been deployed to barricade a door.

FIG. 13 shows different examples of circuitry that may be used to inform the monitoring system whether a system has been deployed, including a remote control and an app running on a cell phone.

DETAILED DESCRIPTION

Figure 2:
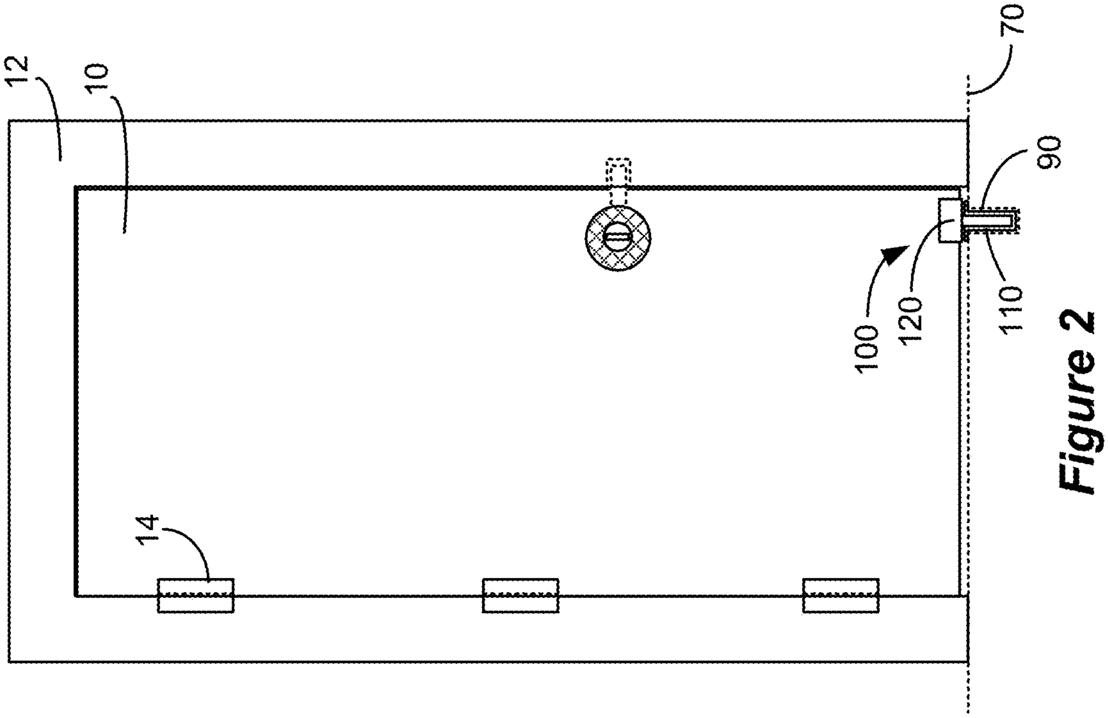
FIG. 2 shows a door barricading system as deployed to barricade a door in accordance with the invention.

By way of summary, and referring to element numerals described later herein, various aspects of Applicant's invention involve the use of an anchor 120 to barricade a door 10 from forced entry. The anchor 120 includes an upper portion 122 to barricade against forced entry, and a lower portion 124 that preferably fits within a receptacle 110 that is recessed into the floor 70. The anchor 120 can be removed from the receptacle 110 when the user doesn't desire to barricade the door, such as when the user may wish to fully open the door 10.

The anchor 120 can include electronics and communication circuitry to allow deployment of the anchor to be monitored by a monitoring system. In one example, such electronics are incorporated into an insert 160 which is preferably removably affixable to the anchor 120. Electronics can also be incorporated into an extension 140 as explained further below. The communication circuitry is configured to send a message, which can include identifying information and an indication of deployment, to the monitoring system. The communication circuitry is also preferably configured to receive alerts from the monitoring system and to indicate relevant indications via its user interface, including alerts to inform a user when his anchor should be deployed in case of an emergency. A Graphical User Interface at a monitoring computer in the monitoring system can display information about anchor deployment at a site being monitored, which may include a number of potentially deployable anchors.

Figure 1:
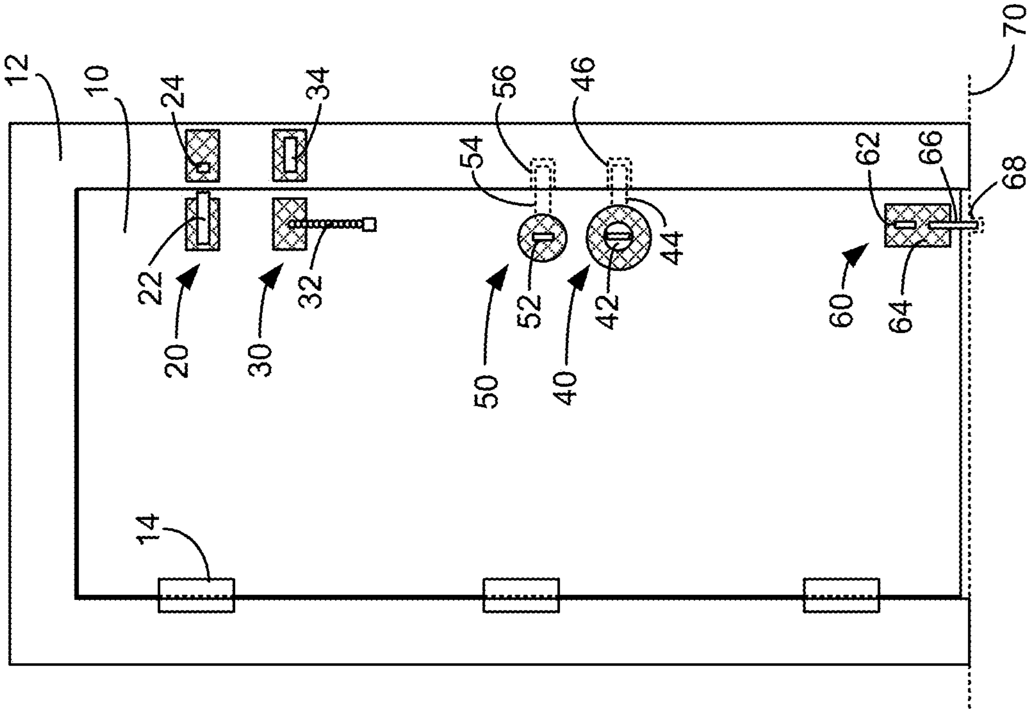
Figure 1 (prior art)
FIG. 1 shows various physical security measures that can be used with doors at a dwelling or business to discourage forced entry into the premises, in accordance with the prior art.
Figure 3:
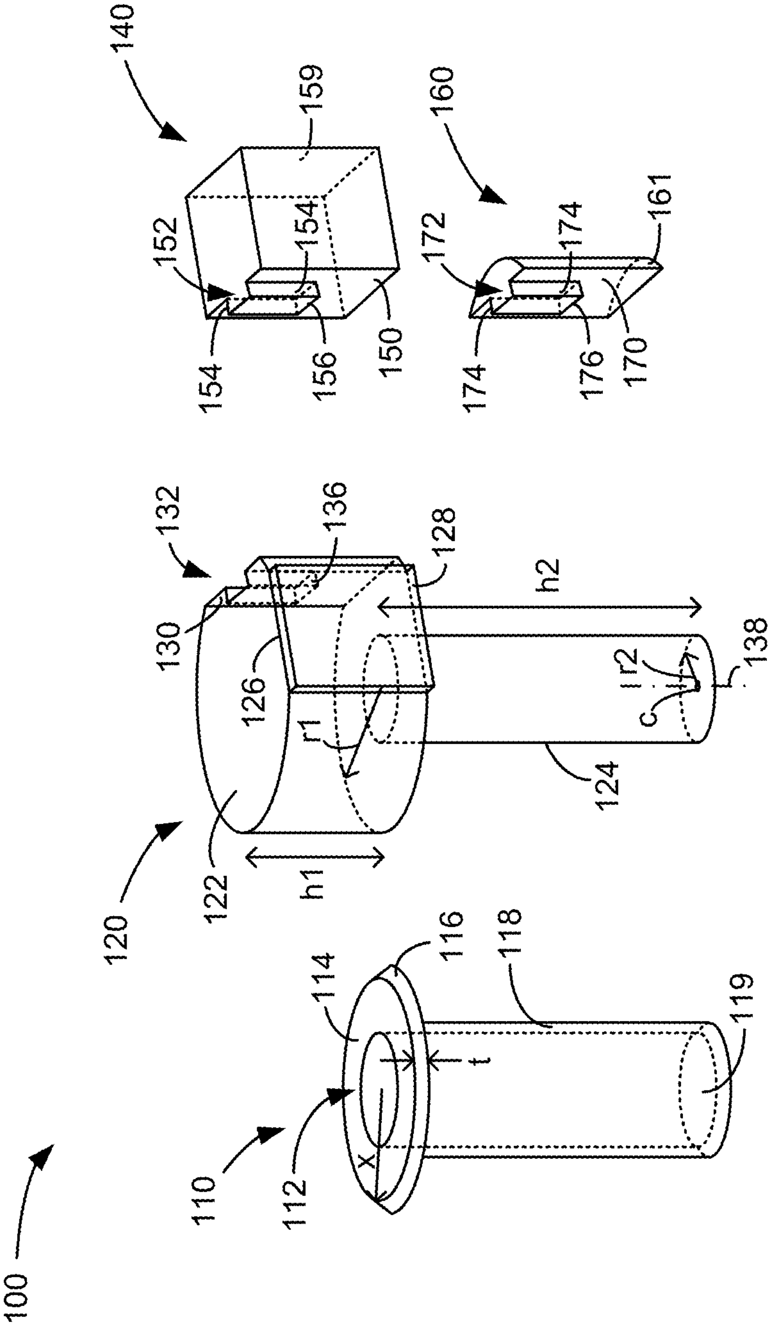
FIG. 3 shows components of a door barricading system for barricading an inward-swinging door, including an anchor, a receptacle, an extension, and an insert with system electronics.

FIG. 2 shows a first example of a barricading system 100, which includes the anchor 120 and receptacle 110 just mentioned. FIG. 2 shows the anchor 120 and receptacle 110 in place with respect to a door 10 that is being secured, while FIG. 3 shows these components in isolation. The system 100 has been installed inside the door 10 (i.e., within the room being barricaded), and in this example barricades an inward-swinging door. However, as explained later, door barricading systems, with some modifications, can also be installed inside the door and used to barricade a door that is outward-swinging. Still other systems described later can be used to barricade double doors, whether inward-ir outward-swinging. Note that a door 10 secured by the barricading system 100 may be protected by other physical security measures as well, such as those described with respect to FIG. 1.

As best seen in FIG. 3, the anchor 120 as mentioned above includes an upper portion 122, and a lower portion 124 that preferably fits within an opening 112 in the receptacle 110. In this example, both the upper and lower portions 122 and 124 are generally cylindrical. However, either of these components 122 or 124 can be made of different shapes. Further details concerning barricading system 100 are described in U.S. Patent Application Publication 2021/0388652, which is incorporated herein by reference in its entirety, and with which the reader is assumed familiar.

Figure 4:
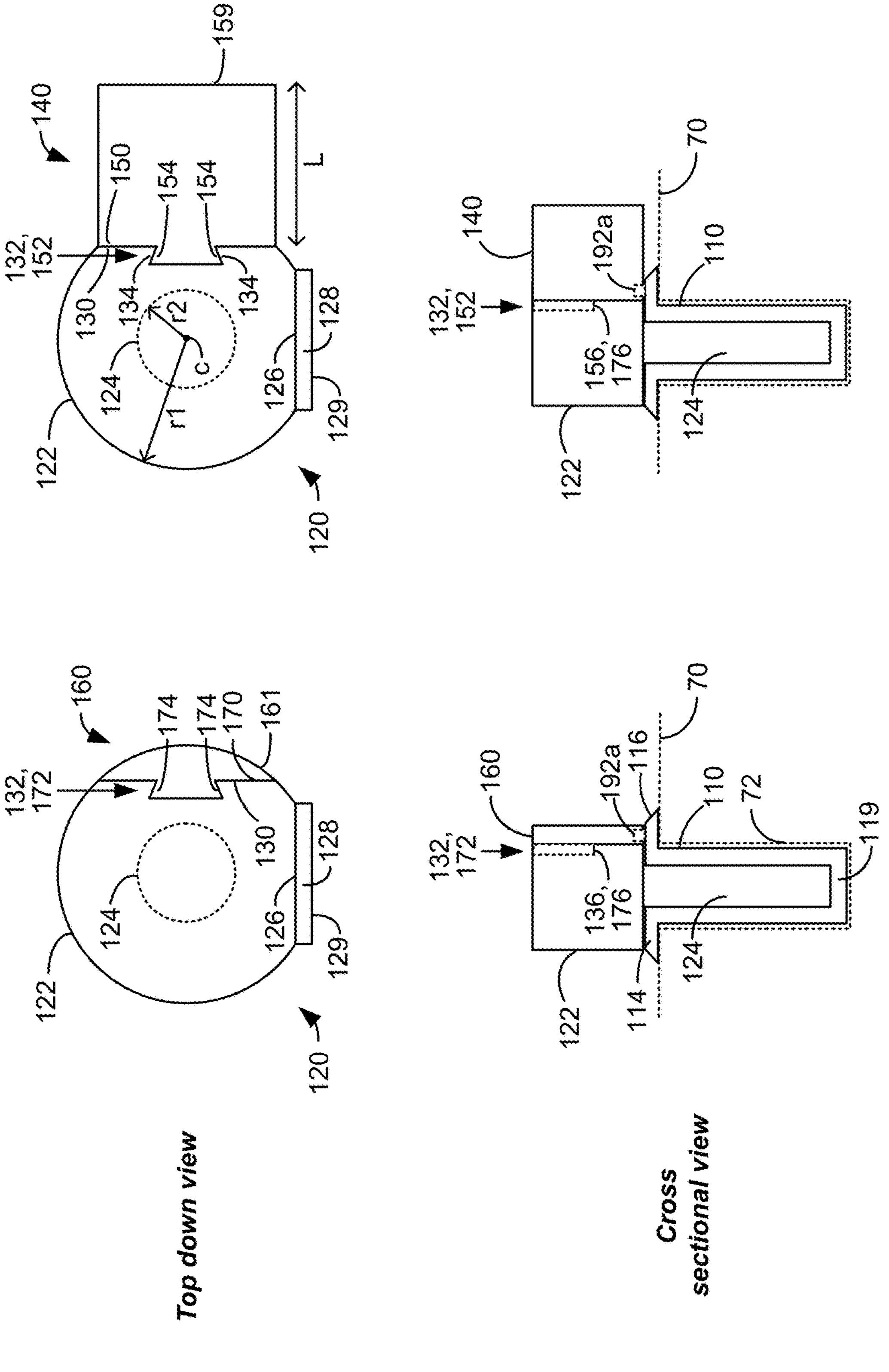
FIG. 4 shows connection of the insert and extension to the anchor, and the anchor's insertion the receptacle.

As shown in FIG. 3, the receptacle 110 includes a vertical sidewall 118 whose inner diameter defines the size of the opening 112, and whose outer diameter is designed to fit in a hole drilled in the floor 70, as shown in the cross-sectional view of FIG. 4. The receptacle 110 may also include a bottom wall 119 attached to the sidewall 118. The receptacle 110 may include a horizontal lip 114 that overlies the floor 70. The lip 114 may include a beveled edge 116 to smooth the transition from the top of the floor 70 to the top of the lip 114. Although not shown, the lip 114 may also be morticed into the floor 70 so that it is flush with the top of the floor. Furthermore, the lip 114 may be absent, in which case the receptacle 110 may include only the sidewall 118 and bottom wall 119. The lip 114 may have a vertical thickness t, and because the receptacle 110 is preferably mounted inside a door which may be inward-swinging, this thickness t is preferably smaller than the vertical clearance between the bottom of the door 10 and the floor 70. This allows an inward-swinging door 10 to freely pass over the receptacle 110 when the anchor 120 is not positioned in the receptacle to barricade the door. The lip 114 may have a radius x (FIG. 3) sufficiently large to allow an underside of the upper portion 122, or undersides of structures which may be connected to the upper portion (explained shortly), to contact the upper surface of the lip 114 when the anchor 120 is inserted in the receptacle 110. Installation of receptacle 110 in a floor 70 is discussed further in the above-incorporated ’652 Publication.

The anchor 120 and receptacle 110 may be made of various materials, and preferably are formed of materials with good mechanical strength able to provide barricading functionality without breaking. For example, these components may be formed of aluminum, steel, or high-density plastics such as PTFE, high-density rubbers, etc. The anchor 120—i.e., the upper and lower portions 122 and 124—is preferably solid for best mechanical strength. However, the upper and lower portions 122 and 124 may also be hollow to some degree, which reduces the weight of the anchor 120. The anchor 120 and/or the receptacle 110 are shown thus far as comprising singular pieces, and may be milled, cut or molded as such. However, these components can comprise individual pieces (e.g., 122 and 124) that are affixed (e.g., screwed) together, as explained later. The upper and lower portions 122 and 124 are preferably formed using cylindrical bar stock materials and thus generally have circular peripheries.

The lower potion 124 of the anchor 120 is preferably sized to slide into, and rotate within, the opening 112 of the receptacle 110. That being said, these portions also preferably have a tight tolerance, such that the lower portion 124 is firmly retained (and will not “wiggle”) within the opening 112. The dimensions of the anchor 120 and the receptacle 110 can vary, and the drawings do not necessarily depict these components to scale. To provide some idea of envisioned sizing of the anchor 120 and receptacle 110, the lower portion 124 may have a radius (r2) in the range of 0.25-0.75 inches and a height (h2) of 2.0-4.0 inches, which would also set the dimensions of the corresponding opening 112 in the receptacle 110. When the anchor 120 is inserted into the receptacle 110, the lower surface of the upper portion 122 may contact the upper surface of the lip 114 (or the floor 70 if the receptacle 110 does not include a lip), and/or the lower surface of the lower portion 124 may contact the upper surface of the bottom wall 119. If the height h2 of the lower portion 124 equals the depth of the opening 112 in the receptacle 110, these points of contact would be established simultaneously, as shown in the cross-sectional view of FIG. 4. If height h2 is larger than this depth, the lower surface of the lower portion 124 would contact the upper surface of the bottom wall 119. If height h2 is shorter than this depth, the lower surface of the upper portion 122 would contact the upper surface of the lip 114 (or the floor).

The upper portion 122 may have a height (h1) of 1.5-4.0 inches to provide a suitably large and secure contact surface with the door 10 that is being barricaded. The upper portion 122 may not be completely circular as explained further below, but is preferably generally circular with a radius (r1) of 1.0-4.0 inches. The upper and lower portions 122 and 124 are preferably colinear about a central axis 138 passing through a center point ‘c’. However, such collinearity is not required, and instead the axes of the upper and lower portions 122 and 124 may not be colinear and hence may be offset from one another, as discussed further in the above-incorporated ’652 Publication.

The upper portion 122 of the anchor 120 preferably includes a flat vertical surface 126, which is cut from the otherwise cylindrical periphery of the upper portion. An optional pad 128 can be affixed to this surface 126. The pad 128 itself has a flat vertical surface 129 (FIG. 4) that is designed to contact and brace the door 10, as explained further below. In one example, the pad 128 comprises a high-density rubber or plastic, and while rigid is preferably also slightly deformable to absorb an external force F (FIGS. 5A & 5B) that might be applied to the door 10. The pad 128 may be connected to the upper portion 122 (e.g., surface 126) using an adhesive or by molding. The surface 129 provides a large-area contact surface, which is helpful to dispersing force F on the door 10, and transferring that force to the lower portion 124 and the floor-mounted receptacle 110. Further, because the surface 129 is planar, and somewhat deformable, contact between the door 10 and the pad 128 is less likely to damage or mar the inside surface of the door.

The barricading system 100 can include additional, optional components also shown in FIG. 3. For example, the barricading system 100 can include an extension 140 affixable to the upper portion 122 to allow the anchor 120 to be configured into two modes, as explained subsequently via FIGS. 5A and 5B. Use of an extension 140 is also described in further detail in the above-incorporated ’652 Publication. The system 100 can also include an insert 160 affixable to the upper portion 122. As described further below, this insert 160 can include electronics to allow a monitoring system (FIGS. 10 and 11) to assess whether a particular barricading system 100 has been deployed to barricade a particular door 10 at a site 300 where multiple barricading systems 100 may be deployed.

The extension 140 and the insert 160 can be connected to or removed from the upper portion 122 through vertical sliding motions. In this regard, the upper portion 122 includes a slot 132 positioned on a flat vertical surface 130 formed on the periphery of the upper portion. This slot is shown at 90 degrees away from the pad 128 around the periphery of the upper portion 122, but could occur at any point along this periphery. The extension 140 and insert 160 include corresponding tabs 152 and 172 formed on their flat vertical surfaces 150, 170. As shown best in the top-down views in FIG. 4, the slot 132 and the tabs 152, 172 can have corresponding angled edges to affix the extension 140 or insert 160 to the upper portion 122 when they are attached by vertically sliding the tabs 152 or 172 downward into the slot 132. In another example not shown, the slot 132 and tabs 152, 172 can be “T” shaped, as opposed to angled edges. Such geometries prevent the extension 140 and/or insert 160 from being pulled (horizontally) away from the upper portion 122. Sliding tabs 152, 172 into slot 132 preferably brings flat vertical surfaces 150 or 170 of the extension 140 or insert 160 respectively into slidable contact with the flat vertical surface 130 of the upper portion 122 where the slot 132 is formed. The extension 140 and insert 160 can affix to the upper portion 122 in other manners. For example, the upper portion 122 can include a tab, with the extension 140 and insert 160 including corresponding slots. (This is true for other examples of systems shown subsequently: tabs and slots depicted on any two affixable components may be reversed such that the tab or slot is located on the other component. Tabs and slots may collectively be referred to as keys).

The tabs 152 or 172 of the extension 140 or insert 160 include horizontal bottom edges 156 or 176 that will bottom out on a corresponding horizontal bottom edge 136 within the slot 132. This positions the extension 140 or insert 160 at the correct height relative to the upper portion 122 when the extension 140 or insert 160 is connected to slot 132, as best shown in the cross-sectional view of FIG. 4. Preferably, although not necessary, the height of the extension 140 and/or insert 160 equals the height h1 of the upper portion 122. When so dimensioned, bottom surfaces of the extension 140 or insert 160 may come to rest on the upper surface of the lip 114 when attached to the upper portion 122 and when the anchor 120 is positioned in the receptable 110 (assuming radius x of the lip 114 is large enough). Although not shown, the bottom surfaces of the extension 140 or insert 160, like the upper portion 122, may also come to rest on the floor 70 (e.g., if no lip 114 is present).

As best shown in the top down view of FIG. 4, the insert 160 preferably includes a curved outer surface 161 such that when the insert 160 is attached to the upper portion, this curved surface 161 matches with the generally cylindrical shape of the outer surface of the upper portion 122. In other words, the curved surface 161 is established at radius r1 (see FIG. 3). The extension 140 by contrast includes a flat vertical surface 159 at the face opposite the tab 152, which surface 159 can optionally be used to contact and barricade the door, as explained further below. Surface 159 could include a pad, similar to the pad 128 affixed to surface 126, but this detail isn't shown for simplicity.

Figure 5B:
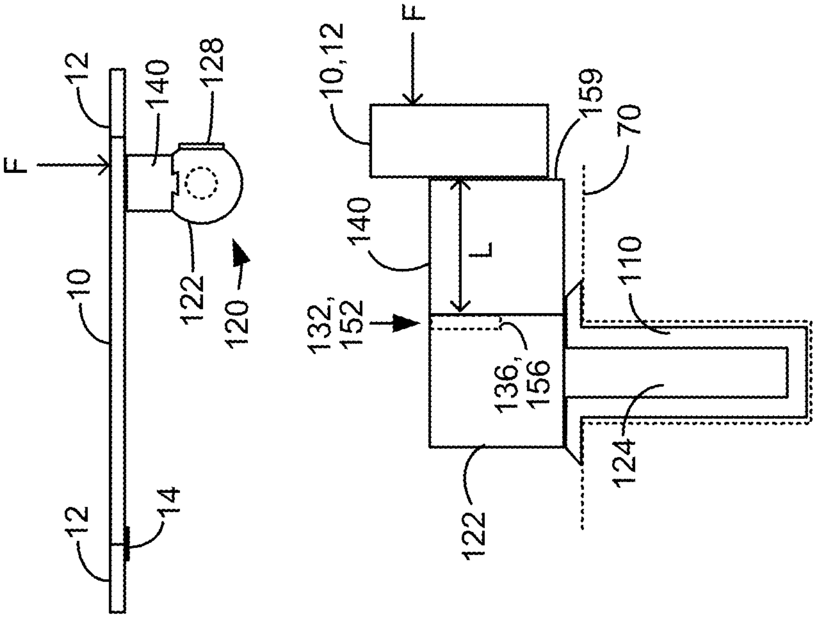
FIGS. 5A and 5B respectively show configuration of the anchor in a first mode to barricade the door without use of the extension, and configuration of the anchor in a second mode to barricade the door using the extension.
Figure 5A:
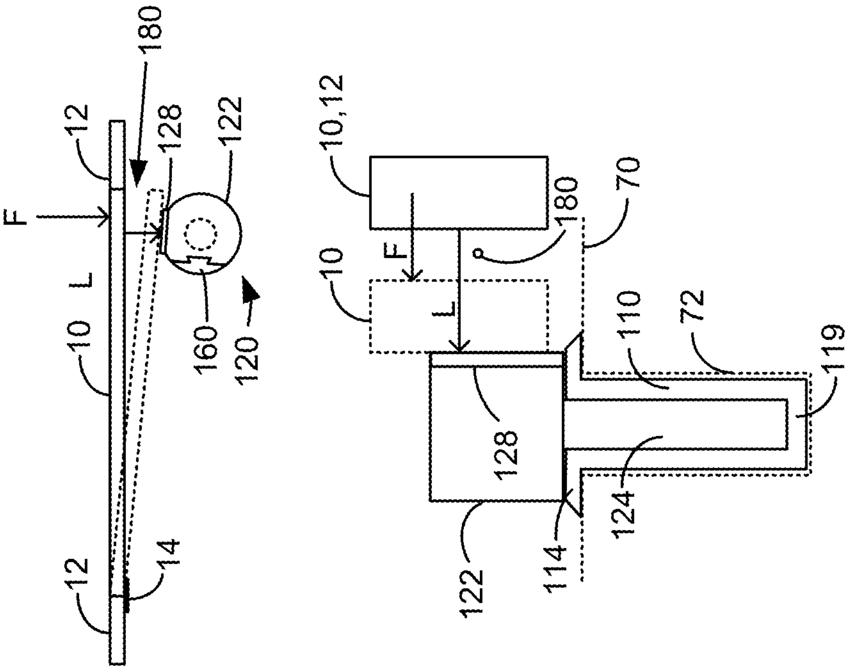

FIGS. 5A and 5B show different manners in which the system 100 and anchor 120 can be used to barricade a single inward-swinging door 10. FIG. 5A shows use of the anchor 120 when the user has attached insert 160 to the slot 132 on the upper portion 122. As shown in the top down view, the insert 160 generally acts to round the shape of the anchor 120, and to cover the slot 132 when the extension 160 is not in use. In this regard, the insert 160 may comprise a "blank" that merely covers the slot 132 and otherwise includes no additional functional features. However, as explained further below, the insert 160 preferably includes communication electronics useful in a barricade monitoring system. When the insert 160 has been attached to the slot 132, the anchor 120 is preferably turned in the receptacle 110 so that the pad 128 generally faces the door 10. The receptacle 110 is mounted a particular distance inside the door 10, such that the door can swing inward a distance L away from its closed position in door frame 12 before it hits the pad 128. (This distance L is preferably the same as the length L of the extension 140, as explained shortly with respect to FIG. 5B). In this regard, even if a force F is applied to the door 10, such as might be applied by an assailant trying to break in the door, the door will only swing inward to the point where it hits the pad 128. As such, the door is adequately barricaded by the anchor 120, even though the door 10 opens by a slight gap 180 before it contacts the pad 128. That the door 10 can be opened by a gap 180 can be a beneficial feature. As explained in the above-incorporated '652 Publication, use of the anchor 120 in this manner allows a user to open the door and look through the gap 180 to verify the identity of a person on the outside of the door, and/or to receive an item (e.g., a letter) through the gap while not opening the door completely and while keeping it barricaded.

FIG. 5B shows use of the anchor 120 when the user attaches extension 140 to the slot 132 on the upper portion 122. In this configuration, the user can position the anchor 120 in the receptacle 110 with the extension 140 facing the door 10. Because this extension 140 has a length L, the contact surface 159 of the extension 140 will touch the door 10 when it is closed within its frame 12. As such, the door cannot be opened to any degree (e.g., there is no gap 180), and the door is barricaded within the frame 12. A user would typically configure the anchor 120 in this manner when visitors are not expected (e.g., at night). If a visitor is present outside the door 10 (e.g., someone knocks or rings the door bell), the user may remove the extension 140 by sliding it vertically away from the upper portion 122, and may also rotate the anchor with pad 128 facing the door (FIG. 5A). The user can then open the door by the gap 180 to verify the visitor while still keeping the door barricaded, as explained earlier with respect to FIG. 5A. If the visitor is verified and is allowed entry, the user can open the door 10 fully by removing the anchor 120 from the receptacle 110 entirety, thus allowing the door 10 to swing over the receptacle 110 in the floor.

To summarize, the anchor 120 is configurable in two modes to barricade the door: a first mode (FIG. 5A; no extension 140) that allows the user to slightly open the door by a gap 180, and a second mode that barricades the door 10 when it is closed in the frame 12 (FIG. 5B, with the extension 140). Note that it is not required in the first mode that insert 160 be attached to the anchor, because the anchor 120 still performs its barricading function without this extra component. Further, in the first mode, pad 128 is not strictly required, as the door 10 can be barricaded by contact with any portion of the outer surface of the upper portion 122. This includes contact with the insert 160 itself if used.

Figure 6:
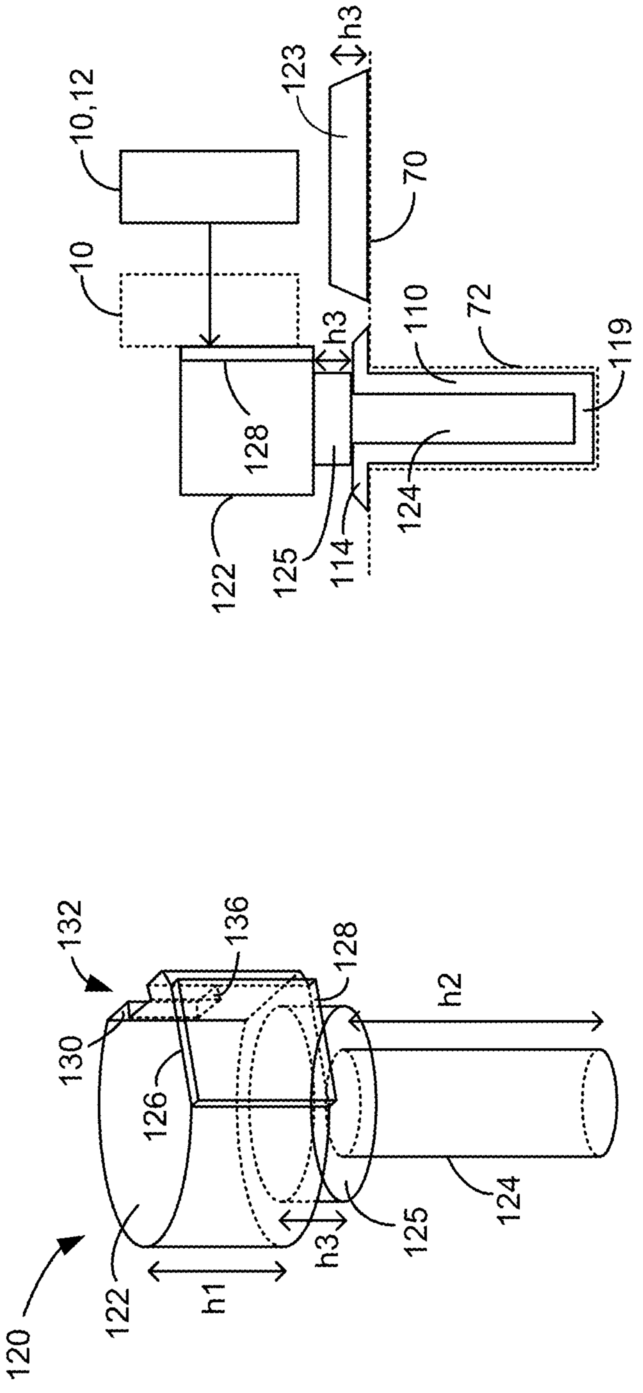
FIG. 6 shows the addition of a collar to the anchor, which can be useful when barricading doors with thresholds.

FIG. 6 shows a modification to the anchor 120, which includes a collar 125. This collar 125 is positioned underneath the upper portion 122, and has a radius larger than the lower potion 124 (i.e., larger than r2; see FIG. 3), such that the collar 125 will come to rest on the lip 114 of the receptacle 110 (or on the floor 70 if the receptacle lacks a lip). This has the effect of boosting the upper portion 122 upwards by a height h3 of the collar 125. This can be particularly useful to bring the upper portion 122 into contact with the door 10 when the door passes over a threshold 123. The height h3 of the collar 125 may be adjustable, and is preferably the same height as the thickness of the threshold 123 as shown.

Figure 7:
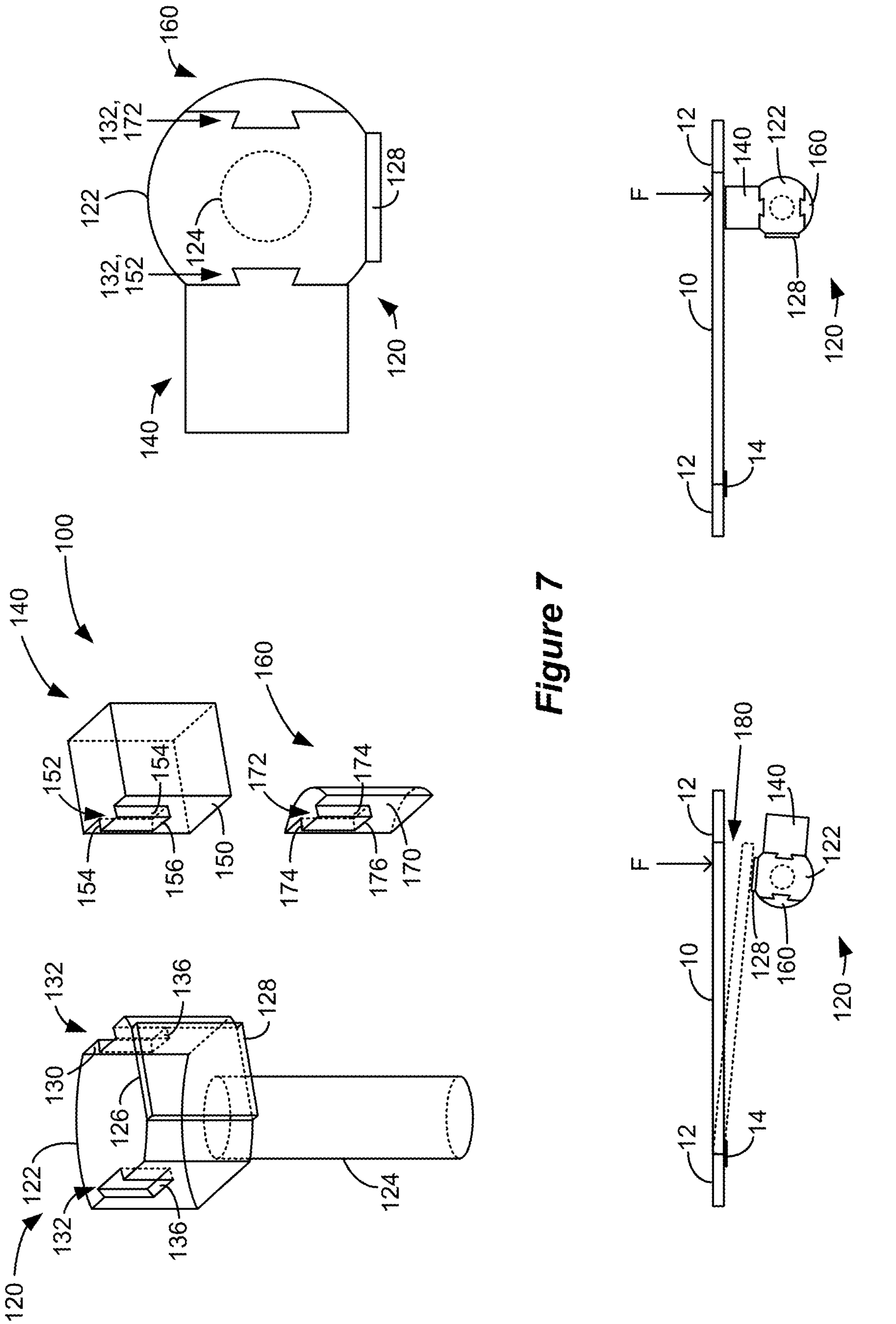
FIG. 7 shows a modification where both the insert and the extension are attached to the anchor.

FIG. 7 shows a variation of the anchor 120 which permits both the extension 140 and the insert 160 be to be simultaneously attached to the anchor 120. In this example, the upper portion 122 of the anchor 120 is formed with two slots 132 on its periphery. These slots 132 are opposed at 180 degrees, and each 90 degrees from the pad 128, but again slots 132 could be formed at any location around the periphery of the upper portion 122. As shown in the top-down view in FIG. 7, both the extension 140 and the insert 160 can be attached to the upper portion at slots 132, using their tabs 152 and 172 as explained earlier. The anchor 120 as modified in this example is configurable into the two modes described earlier even when both the extension 140 and insert 160 are connected. The left bottom view in FIG. 7 shows barricading the door 10 in the first mode, in which the door is barricaded but still openable by a gap 180. In this configuration, the anchor 120 is preferably rotated so that the door 100 will contact pad 128. The extension 140 and insert 160, located 90 degrees relative to the pad 128, do not interfere with barricading operation in this first mode, and so may remain affixed to the upper portion 122. The right bottom view in FIG. 7 shows barricading the door 10 in the second mode, in which the door is barricaded shut within its frame 12 by rotating the anchor with the extension 140 (surface 159) facing the door. The anchor 120 in this example is useful both in its ability to be configurable into these two modes, while still supporting communications with a monitoring system via use of the insert 160.

Figure 8:
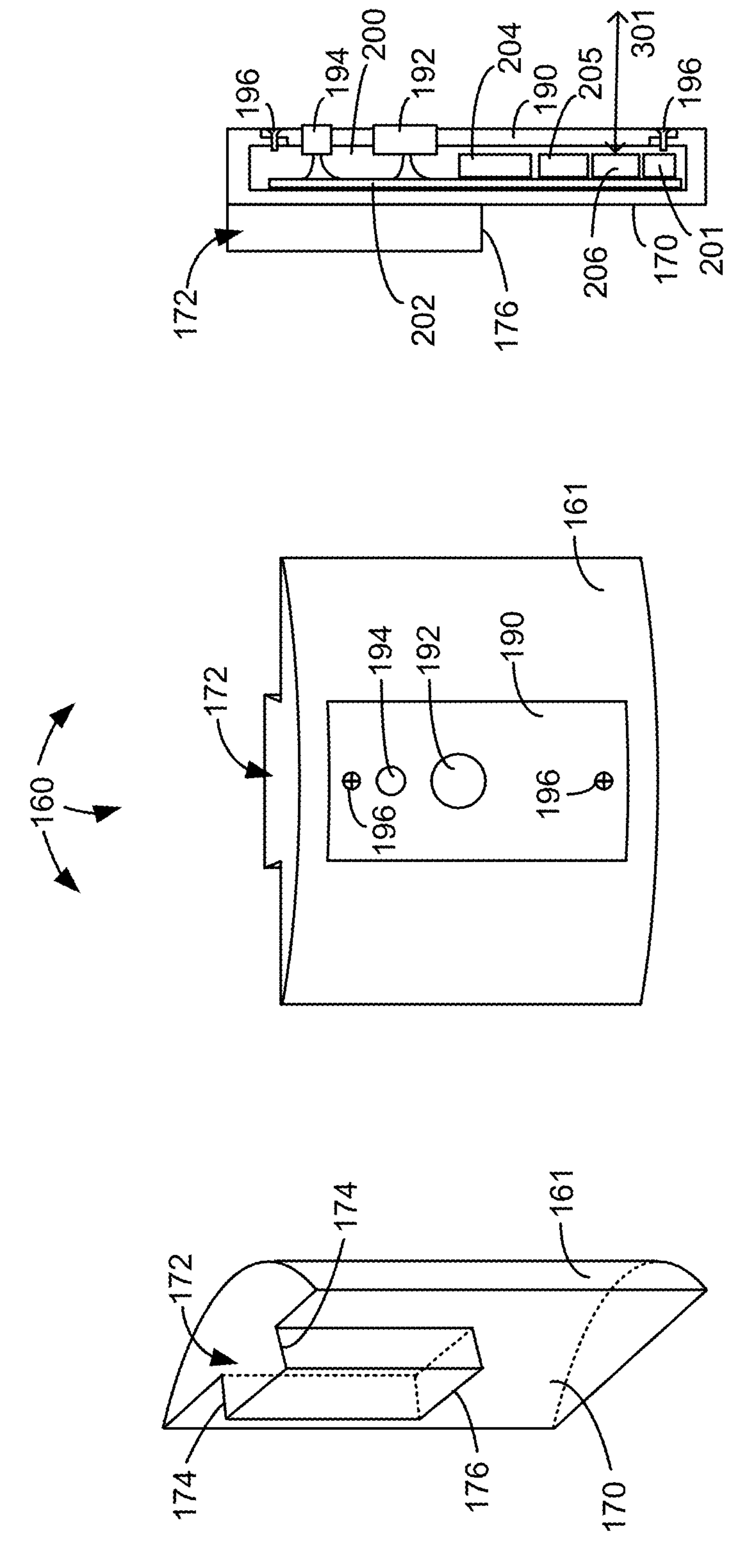
FIG. 8 shows electronics that can be included in the insert to allow the system to communicate with a monitoring system.

As just noted, the insert 160 is useful to support communications with a monitoring system, and FIG. 8 shows further details of circuitry that can be included within the insert 160 that makes this possible. The insert 160 includes RF communication circuitry 206 capable of communicating with the monitoring system, and specifically, to inform the monitoring system when the system 100 has been deployed and is barricading a door. The communication circuitry 206 preferably communicates via a wireless link 301 with a wireless hub 308 at a site 300 where the system 100 can be deployed, as discussed in further detail later with respect to FIGS. 10 and 11. Communication circuitry 206 can include the necessary RF communication chip set to allow bi-directional communications on wireless link 301 in accordance with a number of well-known RF standards (e.g., WiFi, Bluetooth, etc.), as well as an RF antenna compliant with that standard.

Electronics such as the communication circuitry 206 are housed within an electronics cavity 200 formed in the insert 160, as best shown in the cross-sectional view of FIG. 8. This cavity 200 includes a circuit board 202 to integrate the insert's electronics, which can include a battery 204 for operational power, a microcontroller 201 to control system electronics, and the communication circuitry 206. Preferably, the circuit board 202 can also connect to other user interface aspects of the insert 160, including an LED 194, and a switch 192. The insert 160 can include other user interface aspects as well. For example, the insert can include a speaker 205 to provide audible feedback to the user. Although not shown, the insert 160 could also include more sophisticated forms of visual output, such as a screen capable of displaying text or images to a user.

Although not shown, the circuitry within insert 160 can also include Global Positioning System (GPS) hardware, to allow the GPS coordinates of the system 100 to be determined and communicated to the monitoring system via wireless link 301. Similarly to the communication circuitry 206, such GPS hardware can include a GPS chip set and a compliant antenna.

The cavity 200 can be closed by a cover 190 that can attach to the body of the insert 160 via screws 196. The cover 190 may be curved to match the curved outer surface 161 of the insert 160. Cover 190 is preferably removable via screws 196 to allow access to the electronics, which is useful when manufacturing the electronics in the insert 160, and to change the battery 204. Battery 204 may be a coin or button cell battery, such as a CR2032 battery for example. The cover 190 may have openings to allow it to be slipped over the LED 194 and switch 192 when the cover 190 is attached or removed from the insert 160.

While the upper portion 122 to which the insert 160 connects is preferably made of aluminum or steel, the insert 160 is preferably made from a dielectric, non-conductive material, such as high-density PTFE or other hard plastics. This is particularly useful, because a dielectric material will not significantly attenuate transmission from or reception to the communication circuitry 206 along wireless link 301. As such, use of a dielectric material for housing the electronic circuitry is preferred over incorporating the electronics within the conductive upper portion 122 itself, which may more severely attenuate transmission and reception.

Figure 9:
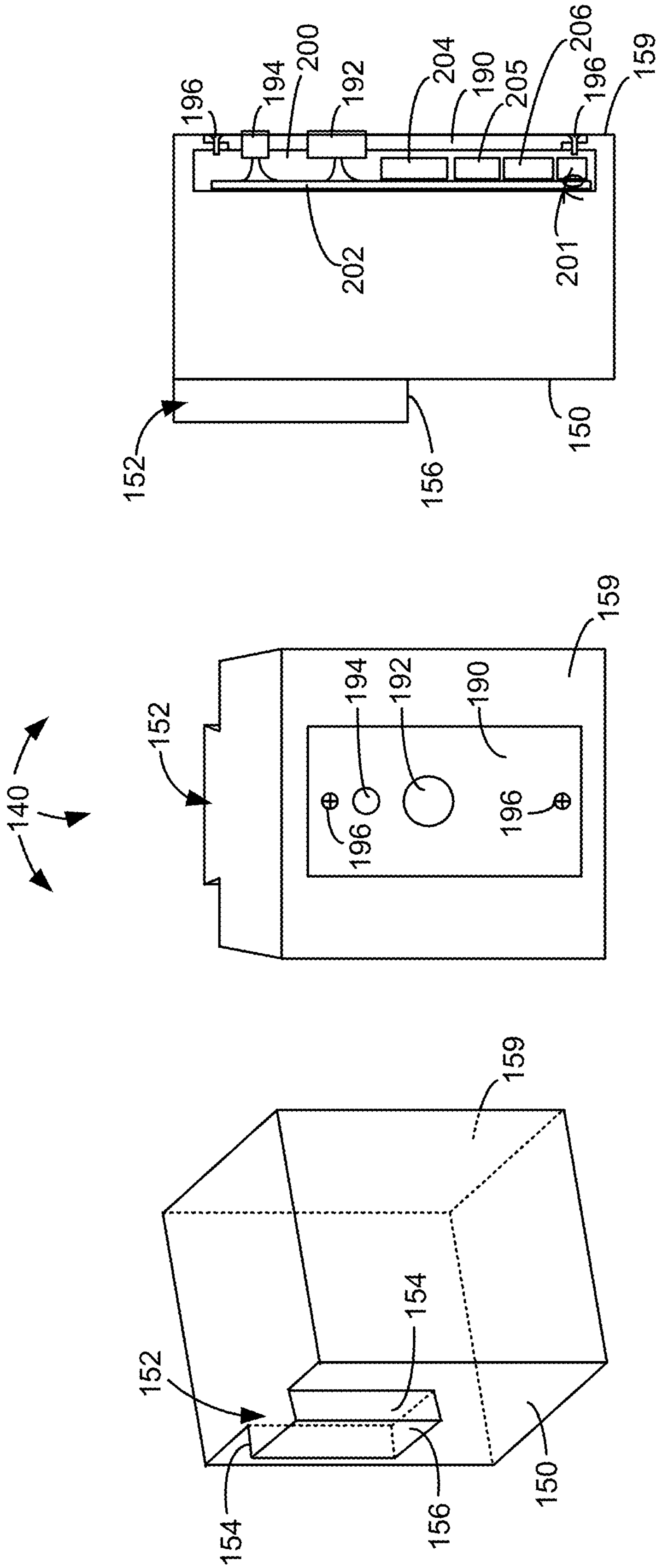
FIG. 9 shows electronics that can be included in the extension to allow the system to communicate with a monitoring system.

Although it is preferred to incorporate system electronics in the insert 160, such electronics can be included elsewhere in the system 100. For example, FIG. 9 shows electronics incorporated into the extension 140 described earlier. Such electronics, and their incorporation into the extension 140, can be the same as described above with respect to FIG. 8, with the same element numbers used to refer to similar components. For the reasons described above, it is preferable to form the extension in this example (at least in part) using a dielectric material to prevent attenuation of data along wireless link 301. In this example, the electronics cavity 200 and cover 190 are formed proximate to the flat vertical surface 159, which as noted above will contact the door 10 when the extension is used. This runs the risk that a forceful impact to surface 159 could damage system electronics, but this is not necessarily the case if the dielectric material is of high strength. LED 194 and switch 192 can be recessed within the cover 190 so that they would not be damaged by impact. Although not shown, system electronics could be located elsewhere in the extension 140 to minimize the risk of damage. For example, system electronics could be located proximate to the top, bottom, or sides of the extension 140 that are perpendicular with surface 159.

The switch 192 in these examples (FIGS. 8, 9) can be used to start or stop broadcasting a message to the monitoring system to inform whether or not the system 100 has been deployed and is therefore currently being used to barricade a particular door. When a user decides to deploy his system 100, he can connect the insert 160 or extension 140 (which contains the electronics) to the anchor 120 as explained earlier, press the switch 192 to begin broadcasting a message, and insert the anchor 120 in its receptacle 110 to barricade a particular door 10. The LED 194 can be lit to inform the user that the system is broadcasting. Once it is no longer necessary to deploy the system 100, the user can remove the anchor 120 from the receptacle 110, and press switch 192 again to stop broadcasting its message to the monitoring system, which will extinguish LED 194. It is preferred that electronics in the system are continually powered (by the battery 204) regardless whether the system is currently broadcasting a message. In this way, the system 100 is prepared to also receive information (e.g., alerts) from the monitoring system, as explained further below. Having said this, switch 192 could also operate as a power on/off switch, or the system (the insert 160 or extension 194) could include an additional power on/off switch (not shown).

When switch 192 is turned on, the microcontroller 201 can cause the system 100 to broadcast a message via wireless link 301 that the system has been deployed, which can be monitored by a monitoring system, as explained further below. This message can comprise different information. In a simple example, the message can include a periodic beacon (ping) to inform the monitoring system that the system has been deployed. More preferably, the message can be formatted in accordance with the RF communication standard being used (WiFi, Bluetooth, etc.) to communicate on wireless link 301, and include at least an ID or serial number of the particular system 100 that has been deployed. Providing an ID number can be important to allow the monitoring system to differentiate between number systems 100 it may be monitoring. The message may also include other identifying information of the relevance to the monitoring system, such as an address at which the unit has been deployed, an indication of a particular door that is being barricaded at that address, etc. If the system electronics includes GPS hardware, the GPS coordinates of the deployed system may also be provided to the monitoring system in the message. Preferably, the system will continuously, or periodically, broadcast its message after switch 192 is depressed and LED 194 is lit, although the system could also broadcast the message just one time.

Figure 10:
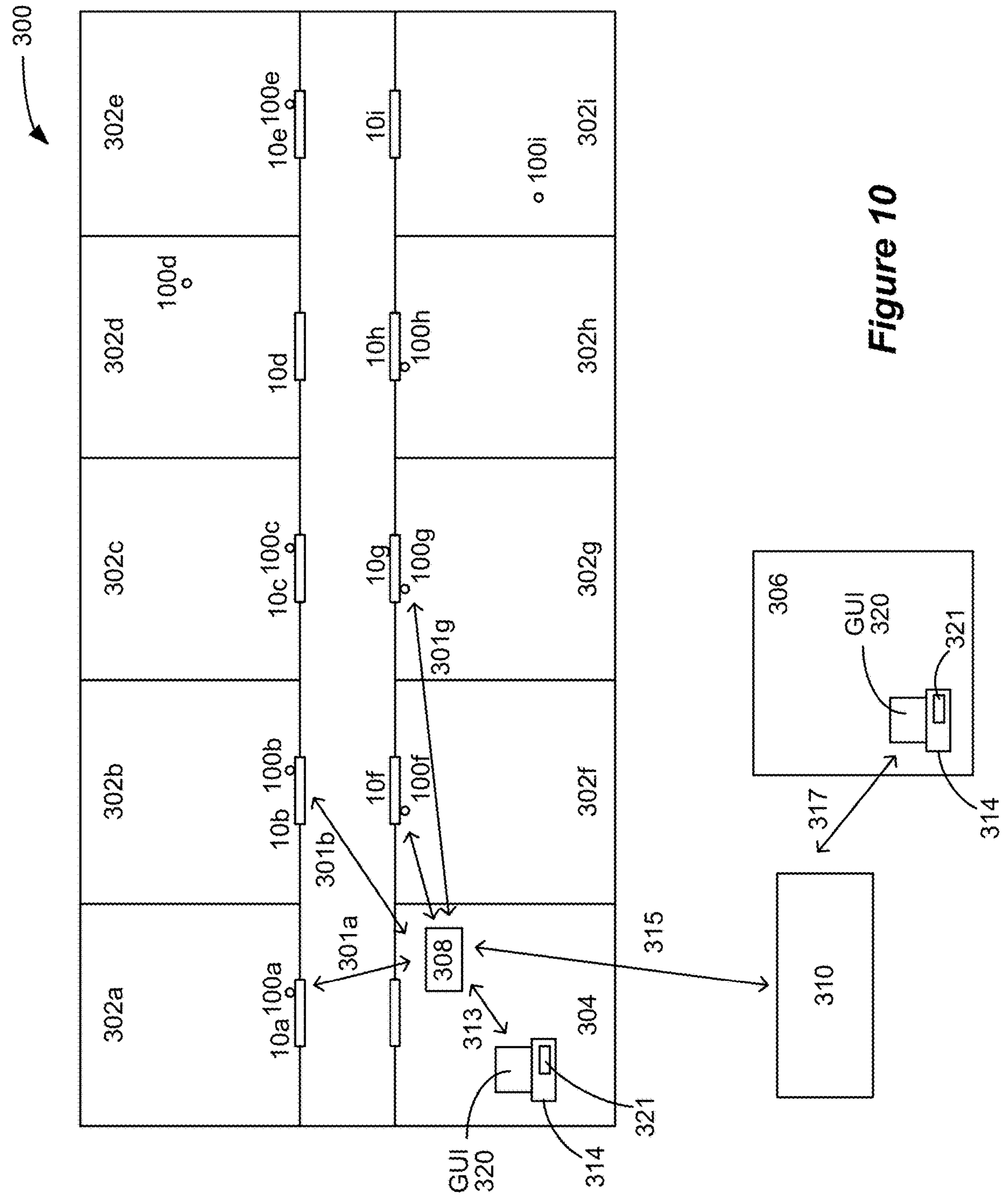
FIG. 10 shows a site being monitored by a monitoring system, where a number of systems are deployable to barricade doors at the site.

FIG. 10 shows an example of monitoring system that is used to monitor deployment of systems 100 to barricade doors 10 at a site 300. The site 300 here is shown as having a number of rooms 302, and may comprise a large or small, public or private, building such as for example a school, a hotel, a business, a library, a government building, a museum, a theater, an entertainment venue, or a church. Each room 302 includes in this example a single door 10 that can be barricaded by a particular system 100. In the event of an emergency requiring users in each of the rooms 302 to barricade their doors 10, users can deploy their systems 100 as explained above by turning on the system (switch 192) and inserting the anchor 120 into their receptacle 110. In the example shown in FIG. 10, the users in most of the rooms have in fact deployed their systems 100 in this fashion. However, the users in rooms 302*d* and 302*i* have not deployed their systems, and thus doors 10*d* and 10*i* are not barricaded.

The deployed systems (100*a, b, c, e, f, g*, and *h*, but not 100*d* or *i*) will as explained above begin transmitting their messages along links 301 to a central hub 308, which is likely (but not necessarily) located at the site 300. The hub 308 can comprise a router, gateway, modem, or similar communication devices. Here, hub 308 is located in an administrative room 304 at the site (which may itself also be barricaded). From here, the messages can be transmitted from hub 308 to a monitoring computer 314. This monitoring computer 314 may be present proximate to (or in the same room as) the hub 308, as shown at 314, and receives the messages from the deployed units via link 313.

The monitoring computer 314 may also be present at a remote location 306 from the site 300 being monitored, in which case the hub 308 passes the messages received from the deployed systems 100 to a network 310 via a link 315. Network 310 may represent or include the Internet for example. From there, the messages are transmitted to the monitoring computer 314 at the remote location 306 via link 317. Network 310 and link 317 may involve other links and intervening communication equipment not shown. The remote location 306 may comprise an office at a monitoring company, a public safety facility such as a police or fire department, or any location where a person monitoring the systems 100 may be present (e.g., the person's home).

The monitoring computer 314 can take any form used customarily to render to Graphical User Interface (GUI) 320 and to allow communication with the systems 100. For example, monitoring computer 314 can comprise a personal computer, a notebook computer, a tablet, a smart phone, etc. Thus, monitoring computer 314 may be fixed or portable. As one skilled in the art will understand, the GUI 320 can be rendered by a program or application 321, which may be installed or downloaded to the monitoring computer 314, or may comprise an on-line program accessible to the monitoring computer 314. The program or application 321 that renders GUI 320 can control other functional aspects of the system described further below. Systems 100 can be monitored by more than one monitoring computer 314 at a time, and one monitoring computer 314 can monitor a number of systems 100 and/or a number of different sites 300 at which systems 100 may be deployed. One skilled in the art will understand that application 321 is embodied in a computer-readable medium, such as a solid state, magnetic, or optical memory, which may comprise memory in the monitoring computer 314 itself, memory in a server coupled to the monitoring computer, or memory on a portable storage device (e.g., a memory stick) attachable to the monitoring computer.

Figure 11:
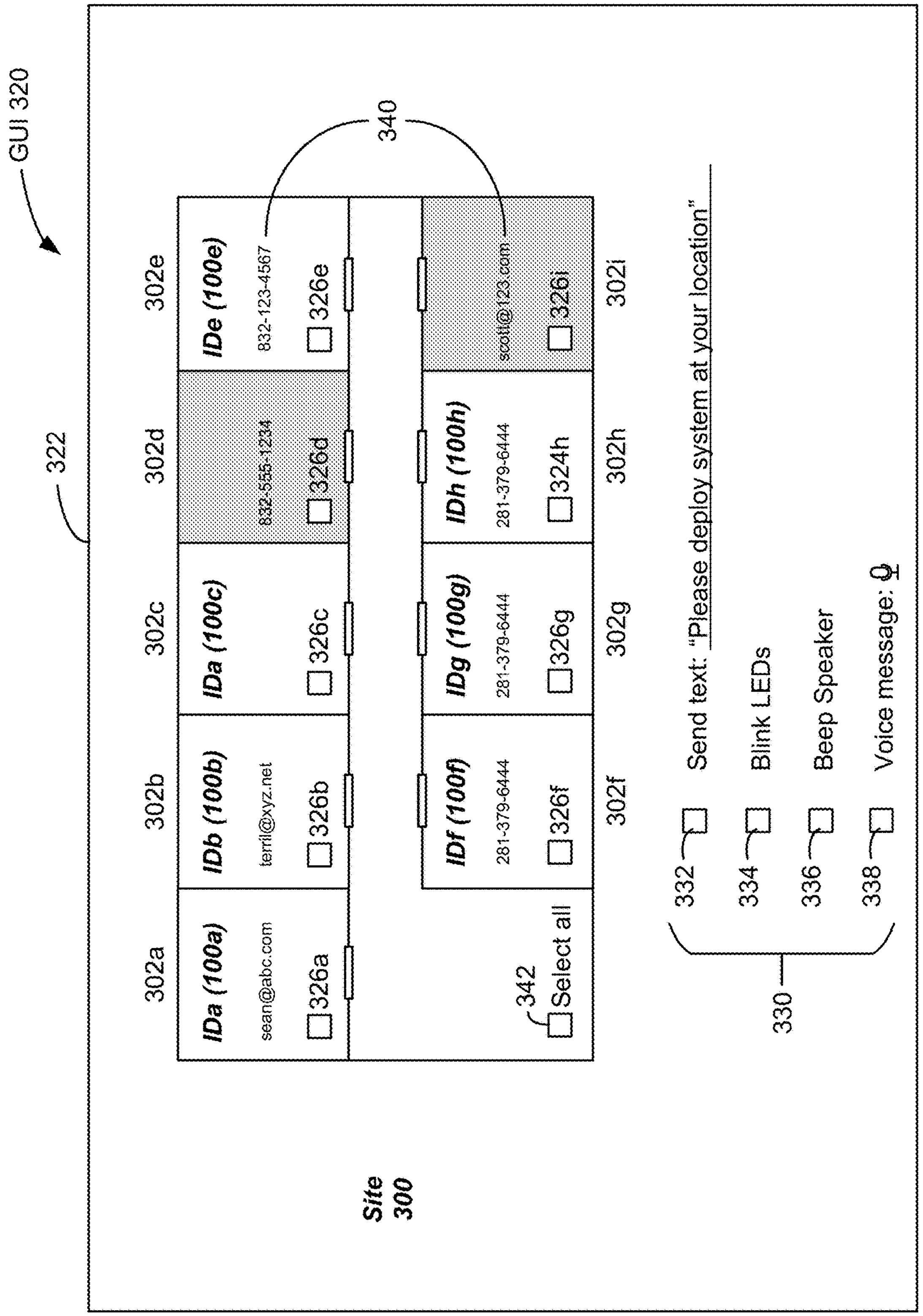
FIG. 11 shows the Graphical User Interface renderable at a monitoring computer to receive messages from the deployed systems to and transmit alerts to those systems.

The monitoring computer 314 at just stated can execute program or application 321 to render a GUI 320 to allow a person monitoring the site 300 to understand which of the systems 100 have been deployed to barricade their respective doors 10, and an example is shown in FIG. 11. While this GUI 320 could take different forms, the depicted form shows a map of the site 300, with the various rooms 302 labeled, and with different indications provided to show whether a given system 100 has been deployed at the site or not to barricade its associated door. For example, upon receiving messages indicating that systems 100*a, b, c, e, f, g*, and *h*, have been deployed, the GUI 320 may indicate this textually, such as by providing the ID of the deployed system 100 (Ida, Idb, etc.). These IDs may comprise the messages as reported from each of the systems, as discussed earlier. Other textual information may be displayed as well, such as the GPS coordinates of the deployed systems 100 if they have GPS capability, as described earlier. Because messages (IDs) from systems 100*d* and 100*i* have not received, these text fields are blank in affected rooms 302*d* and 302*i*, thus indicating their lack of deployment. Alternatively, the GUI 320 may denote whether a given system has been deployed, and its door barricaded, through some form of graphical information. For example, rooms 302*d* and 302*i* are shaded in FIG. 10 to depict that systems 100*d* and 100*i* appear to have not been deployed.

The GUI 320 can also be used to communicate alerts to selected systems 100, or to all systems, at the site 300. To do so, the GUI 320 includes inputs 326 to allow monitoring personnel to send alerts to selected systems. For example, a user can select inputs 326*d* and 326*i* corresponding to non-deployed systems 100*d* and 100*i* to alert users in rooms 302*d* and 302*i* to deploy those systems. Such alerts can be entered in various manners using alert options 330 of the GUI 320, and transmitted to the user interface aspects (LED 194, speaker 205, display if present) of the electronics at each of the systems, i.e., to their inserts 160 or extensions 140. For example, option 334 can be used to cause the LEDs 194 at the selected systems (e.g., 100*d* and 100*i*) to blink to notify users in rooms 302*d* and 302*i* to deploy these systems. Option 336 can be used to issue an audible alert (e.g., beeps) at the speakers 205 in those systems (if present). Option 338 can be used to send a voice message, e.g., using a microphone associated with the monitoring computer 314, which again may be broadcast by optional speakers 205. Option 332 can be used to send a text message to a display on the selected systems (if a display is present). Option 342 can be used to select all of the systems 100 (to check all of inputs 326*a*-326*i*) at site 300 to send alters to all units simultaneously if necessary. This is useful in case of an emergency, as monitoring personnel can send alerts to all systems at the site 300 to inform uses in the various rooms 302 to deploy their systems 100.

The application or program 321 that renders the GUI 320 may also include contact information 340 associated with each of the systems, with alert options 330 additionally or alternatively sent using such contact information. This contact information 340 may be entered into the application or program 321 using GUI 320 (not shown) by monitoring personal or by purchaser of the systems 100 (e.g., during monitoring system registration). The GUI 320 may show this association of contact information with the various systems 100. For example, systems 110*a*, 110*b*, and 110*i* are depicted as associated with various email addresses. Systems 100*d*-100*h* are associated with different cell phone numbers. System 110*c* is not associated with any contact information at all. Each system 100 can be associated in the application or program 321 with more than one piece of contact information, and still different forms of contact information could be used. Alert options 330 can be sent using the contact information 340 associated with the selected systems (326), i.e., to the cell phones of particular users. For example, alert options 332 and 338 can be used to send an email, text, or voice message to users in rooms 302*d* and 302*i*, advising those users to deploy their systems. To the extent users would receive such emails, texts, or voice mails by phone, an application ("app") may be made accessible to such users for download to their phones that acts as a client to the master application or program 321. To summarize, the application/program 321 and GUI 320 can be used to send alerts to the user interface aspects of the systems 100 themselves, and/or to the users of those systems at their various communication devices.

FIG. 12 shows a modification to the insert 160 to allow system electronics to automatically detect when a particular system has been deployed and to start broadcasting its message to the monitoring system. In this example, switch 192 has been modified to comprise a pressure switch 192*a*, which is provided on the bottom side of the insert 160. When the system 100 is deployed and the anchor 120 is inserted into its receptacle 110, this pressure switch 192*a* will automatically be depressed and start broadcasting the system's message by coming into contact with the upper surface of the lip 114 (or the floor 70 if no lip is present). See FIG. 4. By contrast, when the system 100 no longer needs to be deployed, the anchor 120 can be removed from the receptacle 110, which relieves pressure on the switch 192*a* and stops broadcasting of the message.

In other words, the system 100 can be designed to automatically determine whether or not it is deployed, and to automatically start or stop broadcasting its message to the monitoring system accordingly. Switch 192*a* provides just one example showing such functionality. Other means of automatic detection of system deployment are possible, and switch 192*a* may be configured differently or located elsewhere in the system. The extension 140 can also include switch 192*a* if it contains system electronics. See FIGS. 4 and 9. Automatic detection of system deployment may not require detecting when the anchor 120 has been inserted in the receptacle 110. It can also involve system electronic detecting that the insert 160 has been connected to the anchor 120 (i.e., right before the anchors is inserted in the receptacle). In this regard, although not shown, switch 192*a* may intervene between the insert 160 and the upper portion 122 of the anchor 120 in a manner that depresses the switch 192*a* when the insert 160 is connected to the anchor. Automatic detection need not involve a pressure switch. Other means of electronic and/or optical detection of deply, emt could also be used to determine if the insert 160 has been connected to the anchor 120, and/or if the anchor 120 has been inserted in the receptacle 110.

System electronics do not necessarily have to be affixable to the anchor 120 to allow for remote monitoring of deployment, and in this regard an insert 160 is not strictly required to provide system monitoring functionality. FIG. 13 shows other electronics a user can use to indicate system deployment and/or to receive alerts. Remote control 350 can include the same system electronics of the insert 160 or extension 140 as explained earlier, and hence acts to send or stop sending a deployment message to the monitoring system, although it is hand-holdable and not affixed to the anchor 120. (In this regard, note that insert 160 or extension 140 can be viewed as a special case of a remote control 350 which is affixable to the anchor 120). Cell phone 360 is programmed with a downloadable application ("app") 362 that provides the necessary user interface (e.g., switch 192 and indicator 194) for communication with the monitoring system. This example is advantageous because it leverages communication functionality that cell phones 360 typically provide, and eliminates the need to market the system 100 with its own custom system electronics. For example, a cell phone 360 typically allows for RF communications (WiFi, Bluetooth), thus mooting the need to provide RF communications circuitry 206. Remote control 350 and phone 360 can thus be considered and comprise part of the door barricading system, even though not physically integrated with the portion of the system that physically barricades the door.

To this point, system 100 has been illustrated in a configuration useful for barricading inward-swinging doors. However, use of the disclosed communication aspects can also be used in door barricading systems that barricade outward-swinging doors. An example of a door barricading system 400 that barricades outward-swinging doors is shown in FIGS. 14-16B. This system 400 is largely explained in U.S. Patent Application Publication 2021/0388653, which is incorporated by reference in its entirety. The reader is assumed familiar with the '653 Publication, and system 400 is therefore only briefly described here.

System 400 includes an anchor 120 and a door bracket 450 affixable to the door. The anchor 120 can largely be similar to the anchor described earlier, and includes an upper portion 122 designed to connect with the door bracket 450 as explained further below, and a lower portion 124 that preferably fits within a receptacle 110 mounted in the floor 70 inside of the door. Receptacle 110 may be as described earlier. System 400 may also include the insert 160 as described earlier, which provides communication functionality for the system. As before, the insert 160 may couple to the upper portion 122 via tab 172, which connects to a slot 132 on the upper portion 122.

The door bracket 450 is shown in further detail in FIGS. 15A-15D, and includes a stop 452 designed to contact the outside surface 10*a* of the door 10, and a key plate 454 on the inside surface 10*b* of the door 10. The door bracket 450 further comprises a horizontal cross member 458 such as a bolt, which connects the key plate 454 and the stop 452 through an opening 13 in the door 10. The bolt 458 and stop 452 may be formed as a single integrated piece as shown, and may be milled from cylindrical bar stock in one example. Cross member 458 may also connect the key plate 454 and the stop 452 under or around the door 10, which can be beneficial because an opening 13 through the door is not required, but this example is not depicted. If the cross member 458 passes under or around the door, it is preferably thin enough so that the door is not impeded in swinging open or closing within the frame 12.

The key plate 454 contains a slot 456, and as noted is mountable proximate to the inside surface 10*b* of the door 10. The bolt 458 passes through an opening 13 formed in the door 10 (which can be drilled), such that when the bolt 458 is connected to the key plate 454, the stop 452 is mounted proximate to the outside surface 10*a* of the door and the key plate is mounted proximate to the inside surface 10*b* of the door. As FIG. 15D suggests, opening 13 is preferably formed in the door 10 towards the bottom edge of the door, and preferably opposite the hinges 14, which allows the system 400 to barricade the door and prevent it from swinging open to the outside. The manner and position at which opening 13 is formed may depend on the material of the door, and may be formed through the bulk of the door (e.g., a wooden door) or through a mullion (e.g., the metal frame of a glass door). The diameter of the opening 13 is preferably just slightly larger than the diameter of the bolt 458.

Figure 15C:
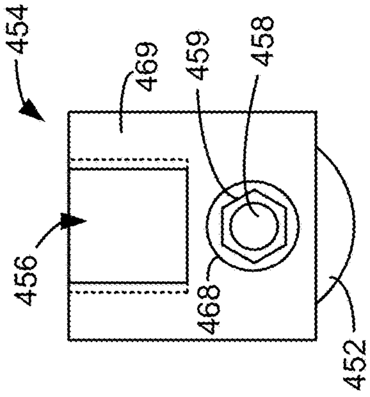
FIGS. 15A-15D show further details of the door bracket of FIG. 14.
Figure 15D:
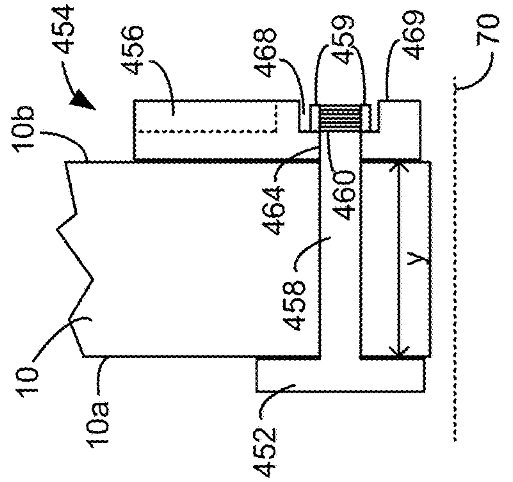
Figure 15A:
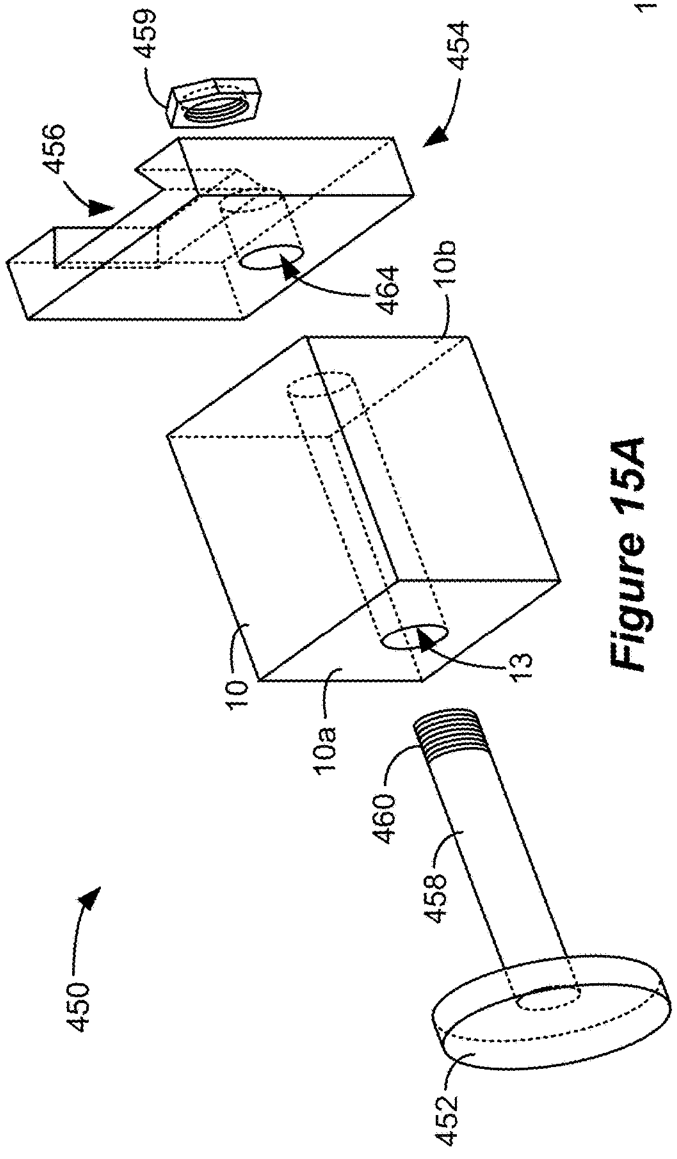
Figure 15B:
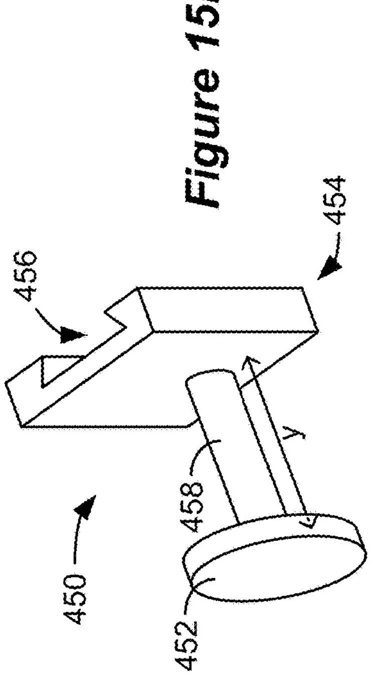

The pieces of the door bracket 450 are connected using a fastener, such as a nut 459, which is connected to threads 460 on the end of the bolt 458. Specifically, the bolt 458 is passed through the opening 13 and through a horizontal opening 464 of the key plate 454. As best shown in the plan and cross-sectional views of FIGS. 15C and 15D, the key plate 454 includes a recess 468 to broaden out the diameter of the opening 464 to accommodate the nut 459 when it is affixed to the threads 460 of the bolt 458. As such, when the nut 459 is affixed, the nut is recessed below a planar outside surface 469 of the key plate 454. Having the nut 459 recessed in this fashion facilitates the connection of the anchor 120 to the key plate 454, as explained further below. FIG. 15B shows the door bracket 450 as connected (e.g., using nut 459), but with the door 10 removed for easier viewing. Notice that the nut 459 is preferably located on the inside of the door that is being barricaded. This is preferred, because an assailant on the outside of the door cannot tamper with this nut 459 to remove the door bracket 450.

In one example, when these components of the door bracket 450 are affixed to each other, they are also firmly affixed to the door 10. In this regard, the dimensions of the components can be sized such that when connected to the door, the stop 452 is in firm contact with the outside surface 10*a* of the door, and the key plate 454 is in firm contact with the inside surface 10*b* of the door. In other words, the distance "y" between the inside surfaces of the stop 452 and the key plate 454 can roughly equal the thickness of the door. This isn't strictly required however, and instead, distance y can be longer than the thickness of the door, which allows the door to be opened by a gap while still being barricaded. This is explained further in the above-incorporated '653 Publication. Although not shown, inside surfaces of the key plate 454 and stop 452 that contact the surfaces 10*b* and 10*a* of the door 10 can include pads comprised of a high-density rubber or plastic. Such pads can help protect the door 10 from becoming marred by the door bracket 450, and may help to absorb an external force F that might be applied to the door 10, as explained further below.

Referring again to FIG. 14, the upper portion 122 includes a tab 472 formed on a flat vertical surface 474 on the periphery of the upper portion 122. As with other tabs described earlier (e.g., 152, 172), tab 472 can have angled edges matching corresponding angled edges on the slot 456 of the door bracket 450. In this manner, when the anchor 120 is vertically inserted into the receptacle 110, the upper portion 122 of the anchor 120 engages the key plate 454 affixed to the door 10 by sliding tab 472 into slot 456. Although not numbered in FIG. 14, the tab 472 and 456 have horizontal bottom edges that will allow the tab 472 to bottom out in the slot 456, as described earlier.

Figure 16B:
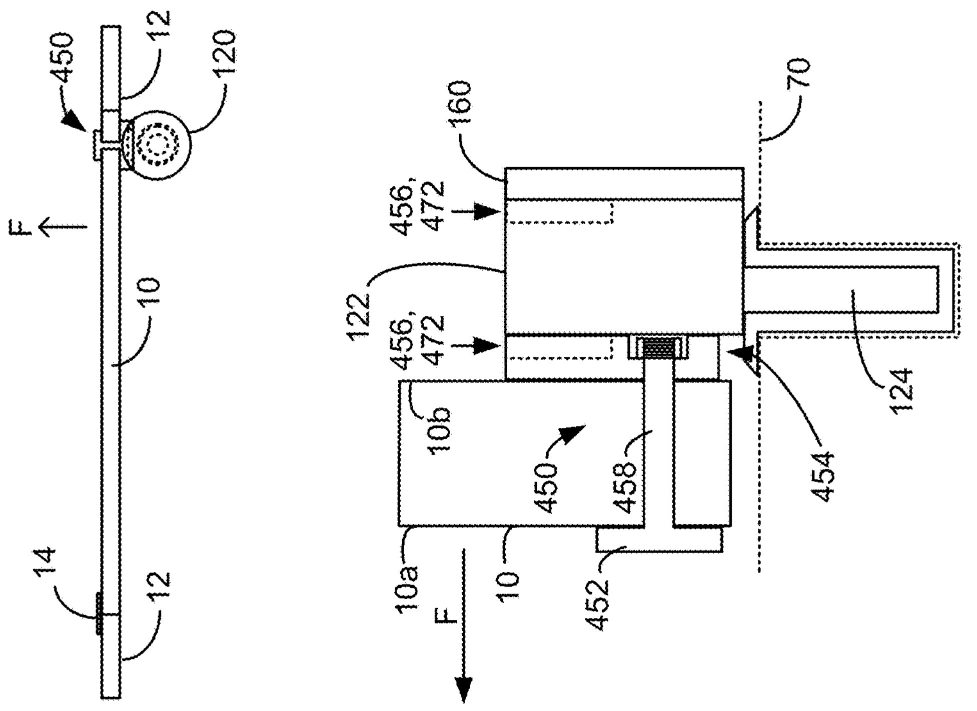
FIGS. 16A and 16B show operation of the system of FIG. 14.
Figure 16A:
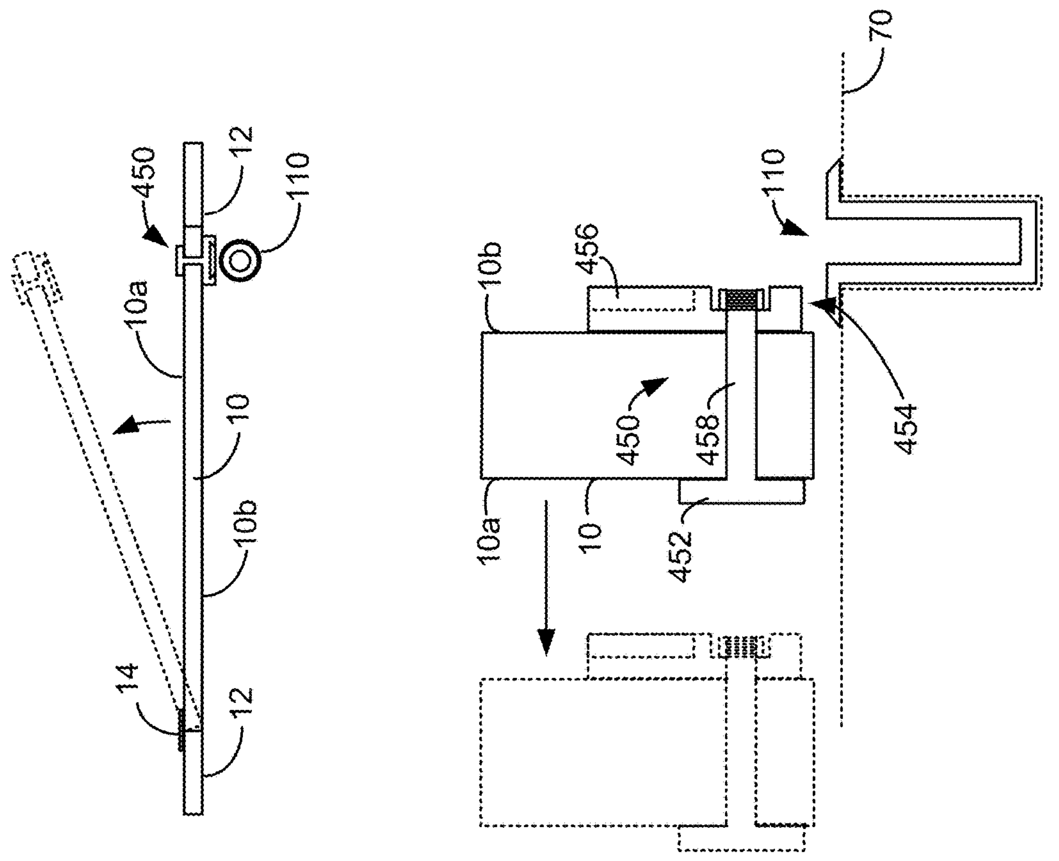

Engagement between the anchor 120 and the door bracket 450 prevents the door 10 from swinging outwards, as best shown in the cross-sectional view of FIG. 16B. When an assailant wishing forced entry attempts to swing the door 10 horizontally outwards (F), the outside surface of the door 10*a* will contact the stop 452 on the door bracket 450. This stop 452 couples through the cross member 458 to the key plate 454 on the inside surface 10*b* of the door. The key plate 454 remains in position and will not pull away from the upper portion 122 of the anchor 120 because of the angled edges of slot 456 and tab 472. Because the anchor 120 is connected to the floor 70 by the lower portion 124, the door is barricaded from swinging outwards. The anchor 120 can be removed by sliding it vertically upward from the receptacle 110 when the user doesn't desire to barricade the door, as shown in FIG. 16A. This vertical sliding motion removes tab 472 from slot 456 on the key plate 454.

As also shown in FIGS. 14-16B, insert 160 can be affixed to upper portion 122 of the anchor 120, which provides communication flexibility as described earlier. Insert 160 can take any of the forms described earlier, and allows bidirectional communications in a monitoring system, as was explained earlier with reference to FIGS. 10-13.

Figure 17A:
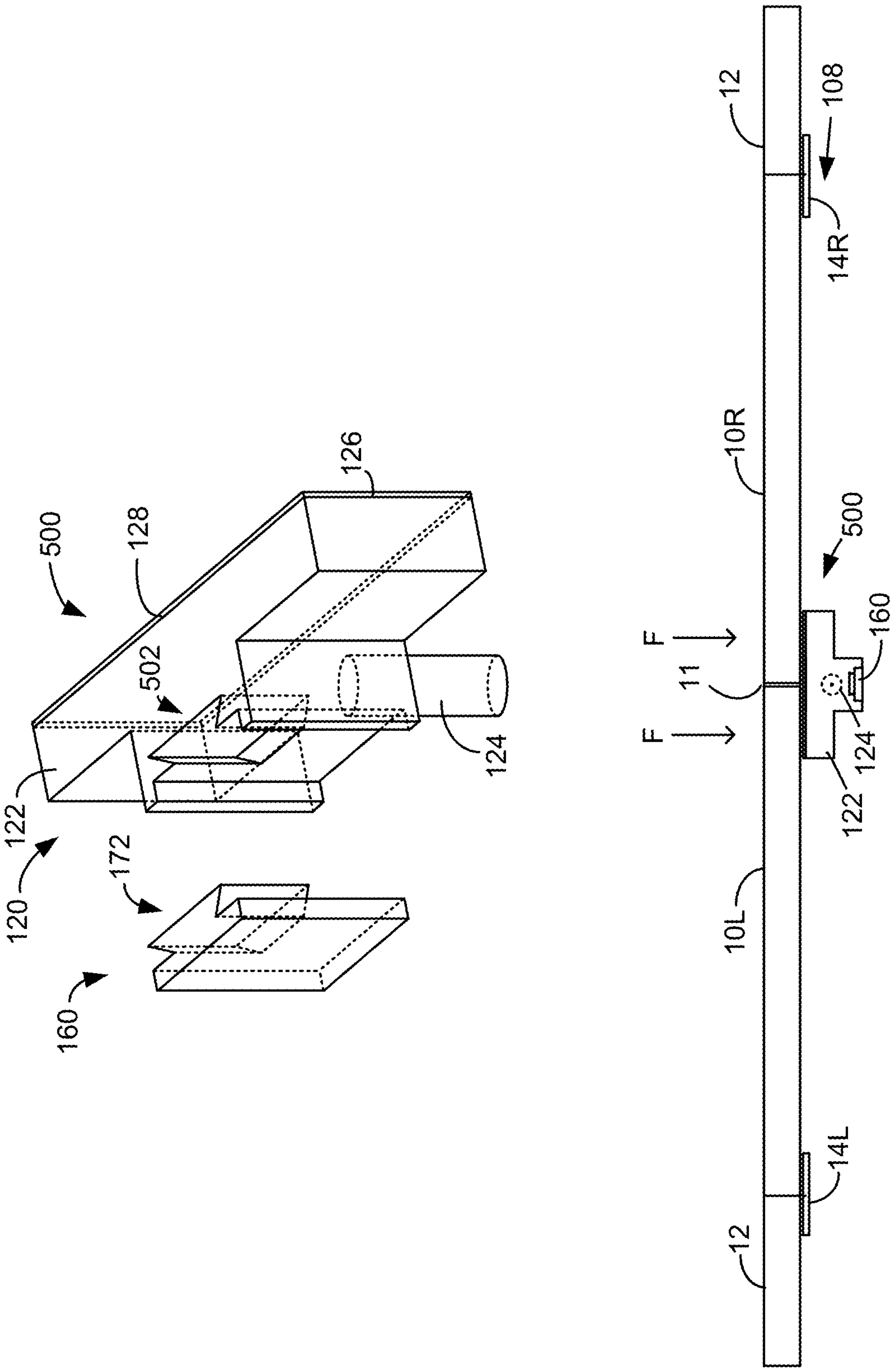
FIGS. 17A and 17B show modified systems useable to barricade inward-swinging and outward swinging double doors.
Figure 17B:
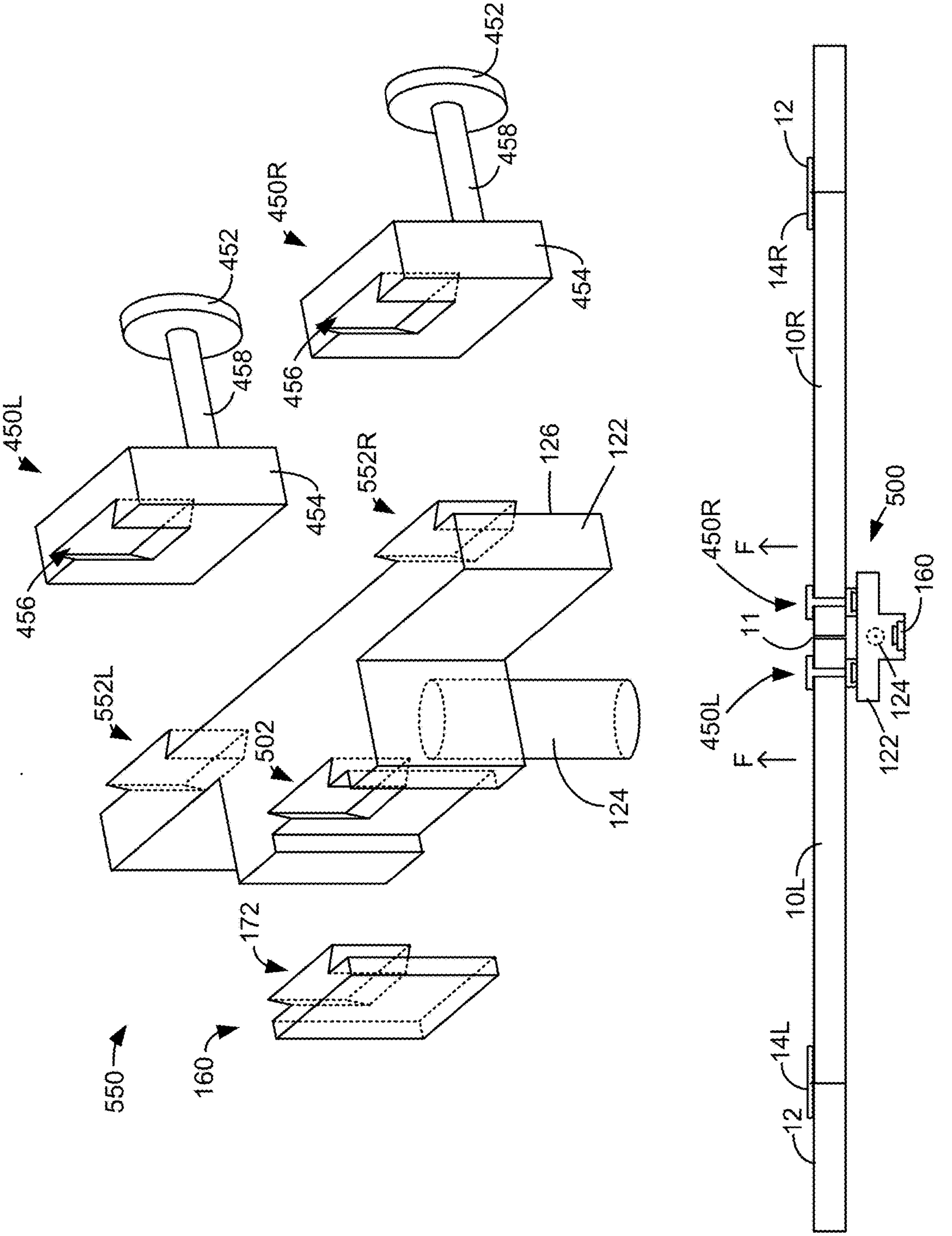

To this point, door barricading systems have been illustrated as useful for barricading single doors. However, the disclosed communication aspects can also be used in door barricading systems that barricade double doors. Examples of door barricading systems 500 and 550 useful respectively to barricade inward- and outward-swinging double doors are shown in FIGS. 17A and 17B. These systems are explained further in the above-incorporated published patent applications, and are only briefly described here.

Some doors that a user might wish to barricade may be double doors, with left and right doors 10L and 10R that are both openable and potentially vulnerable to forced entry. FIG. 17A shows an example where these doors 10L and 10R are inward swinging, and with a system 500 configured to barricade both doors. System 500 comprises an anchor 120 comprising as before an upper portion 122 and a lower portion 124. The upper portion 122 includes a vertical flat surface 126 which can contact and barricade both of doors 10L and 10R. This surface may include a pad 128 to absorb shock and prevent damage to the inside surface of the door. In this example, the surface 126 is larger in surface area to allow it to contact both doors 10L and 10R when installed.

The bottom of FIG. 17A shows an example of this system 500 in operation. As before, the system can be installed in the floor 70 at different locations relative to the doors 10L and 10R. In FIG. 17A, the receptacle 110 (not shown) is installed close enough to the doors 10L and 10R such that when the lower portion 124 is inserted, the doors are barricaded when closed in frame 12. Although not shown, moving the receptable 110 away from the doors would still barricade them while allowing them to be opened by a small gap, which can be beneficial for the reasons stated earlier. Otherwise, the receptacle 110 has been installed generally in line with a scam 11 between the two doors 10L and 10R. Also shown in FIG. 17A is an insert 160, which is affixable to the upper portion 122. Specifically, the upper portion 122 has been configured to include a slot 502 to meet the tab 172 on the insert 160. The insert 160 as before includes communication electronics as is useful for monitoring system deployment, and in this example is differently shaped (rectangular) in a manner to recess within the upper portion 122 when it is installed. Otherwise, this insert 160 functions as described earlier, and may include the same user interface aspects.

FIG. 17B shows an example of system 550 useful to barricade double outward-swinging doors 10L and 10R. This system 550 is generally similar to system 500 just explained, but includes tabs 552L and 552R on its vertical surface 126. These tabs 552L and 552R affix with slots 456 on left and right door brackets 450L and 450R respectively mounted to the doors 10L and 10R. These door brackets 450 can be as described earlier, each comprising a key plate 454 with the slot 456, a cross member 458, and a stop 452. Care should be taken to affix the door brackets 450L and 450R at the proper positions on doors 10L and 10R to ensure that the tabs 552L and 552R will vertically slide into the slots 456 when the lower portion 124 is vertically slid into the receptable 110 (not shown). System 550 also includes an insert 160, which is affixable to the upper portion 122 similarly to the manner described in FIG. 17A to provide communication functionality.

To this point, examples of door barricading systems have been described to work with particular types of doors, such as single inward-swinging doors (e.g., FIGS. 3-7), single outward-swinging doors (FIG. 14-16B), double inward-swinging doors (FIG. 17A), or double outward-swinging doors (FIG. 17A). This may complicate manufacturing, because each of these system may need to be designed differently depending on the types of doors with which they will be used, thus requiring the manufacturer to make numerous dedicated and different systems to satisfy customer demand.

Figure 18:
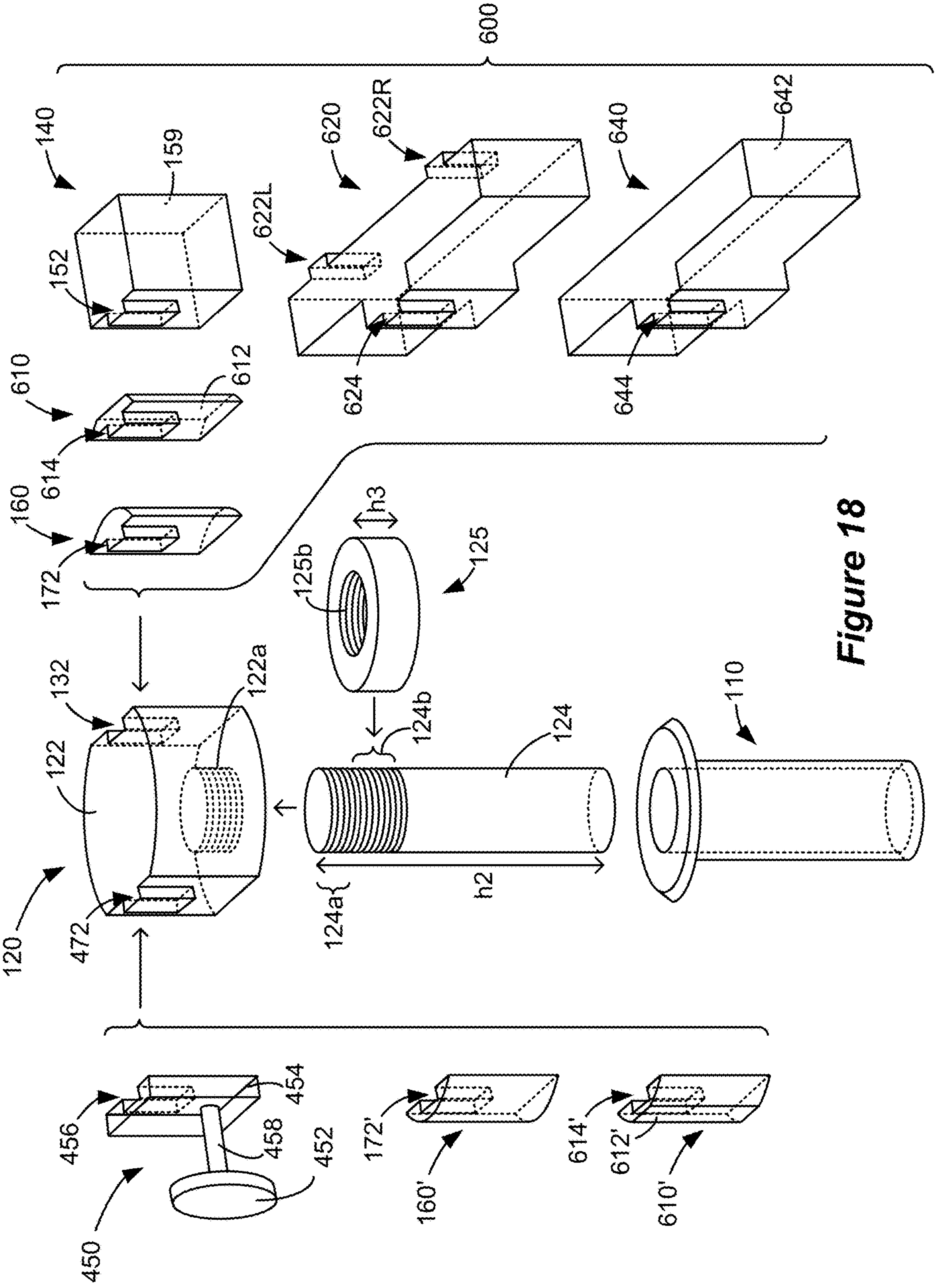
FIG. 18 shows a door barricading system comprising a number of components, which components may be selected to barricade inward-swinging single doors, outward-swinging single doors, inward-swinging double doors, and outward-swinging double doors.

A door barricading system is therefore desired that is more generic and able to barricade any of these types of doors, and FIG. 18 shows an example of such a system 600. System 600 comprises a "one size fits all" solution, with various components of system 600 being used or not depending on the door type to be barricaded. The system 600 can be marketed with all of the components shown, with the customer using only the components needed to barricade the door in question. Alternatively, individual components in the system 600 can be sold or purchased depending on the door in question. System 600 is particularly beneficial for the manufacturer, who need not make dedicated door barricading systems for every different type of door that a customer might wish to barricade. It should be noted that not all components illustrated in system 600 are strictly required. System 600 may comprise more or fewer components compared to those shown.

Figure 14:
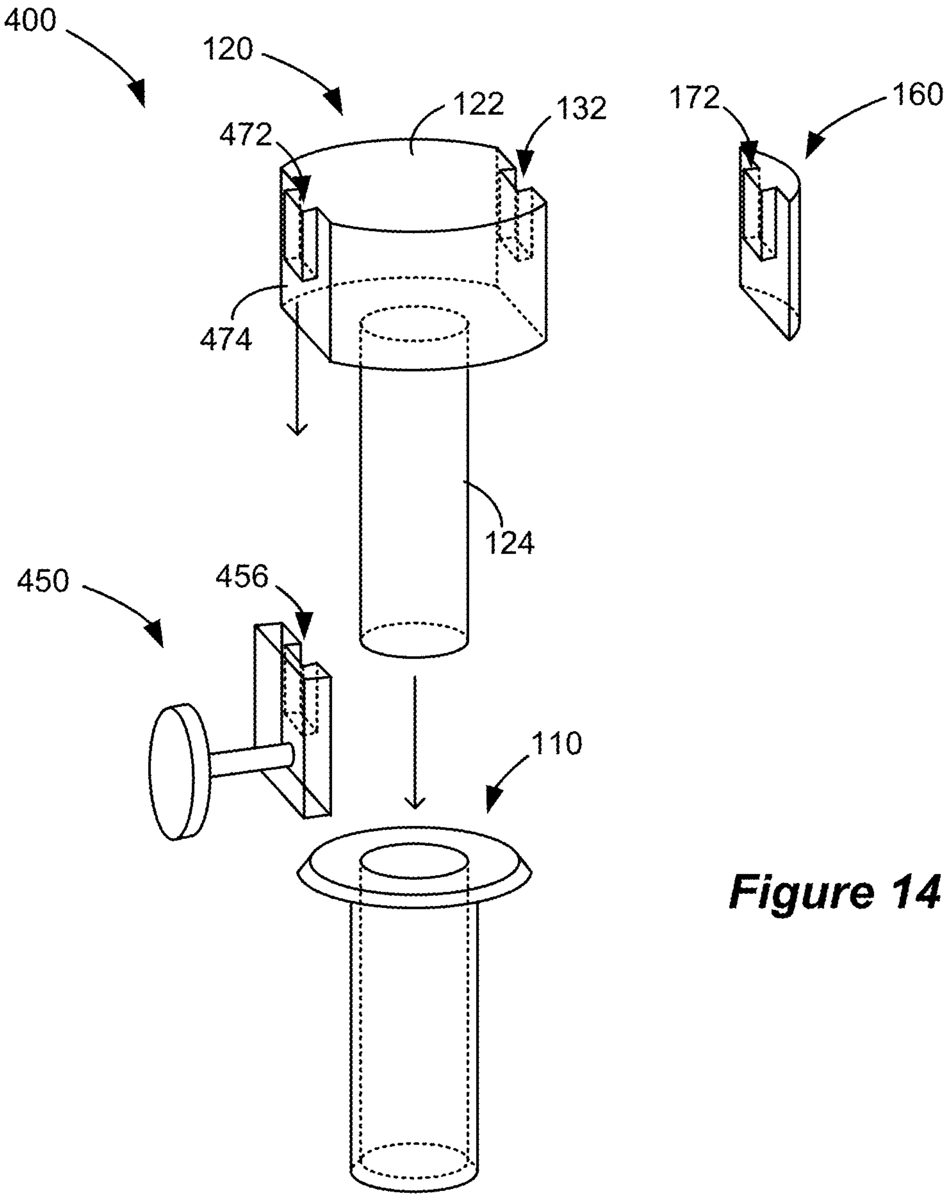
FIG. 14 shows components of a door barricading system for barricading an outward-swinging door, including an anchor, a receptacle, a door bracket that connects through or around the door, and an insert with system electronics.

System 600 includes many of the components described earlier, although perhaps with some modifications. System 600 may include an upper portion 122, and in the example shown includes a slot 132 (FIG. 3) and a tab 472 (FIG. 14). System 600 also includes a lower potion 124 which as before is designed to vertically slide into a receptacle 110 mountable in the floor 70. In system 600, the upper and lower portions 122 and 124 are manufactured as separate components, with the lower portion 124 having threads 124*a* screwable into threads 122*a* formed on the bottom surface of the upper portion 122 to form anchor 120. This is preferred because these components 124 and 122 are more easily manufactured as separate non-integrated components, and because the manufacturer can more easily manufacture the lower portion 124 with different heights (h2). In this regard, system 600 may include a number of different lower potions 124 and a number of different receptacles 110, each having different heights and depths as may be required by different customers.

The lower portion 124 may also include threads 124*b* configured to meet with a collar 125. Threads 124*b* may be contiguous with threads 124*a*. Collar 125 was explained earlier (sec FIG. 6), and is useful to adjust the height of the upper portion 122 relative to the doors(s), which may be particularly useful when system 600 is employed to barricade door(s) having a threshold 123 (FIG. 6). The collar 125 includes internal threads 125*b*, which meet with threads 124*b* below threads 124*a*. Like the lower portion 124, the manufacturer may make collars of different heights h3 to allow the system 600 to be height adjustable. Collar 125 and receptacle 110 are not shown as deployed in subsequent FIGS. 19A-19D) for simplicity.

Various other components can be connected to the upper portion 122, i.e., to tab 472 and slot 130. As described earlier, an insert 160 with communication electronics and functionality can be attached at it tab 172 to the slot 132. Also connectable to slot 132 is a bumper 610. This bumper 610 may be formed of any material, but is preferably formed of high-density plastic or rubber. Unlike the insert, bumper 610 does not include electronics, but is instead a "blank," which can act as a surface to contact an inward-swinging door. In this regard, the bumper 610 may have a flat vertical surface 612 that contacts the door, and is thus analogous to the pads described earlier. The bumper may be formed with a tab 614 to interface with slot 132. Extension 140 can also comprise a component in system 600, and is affixable to the slot 132 via its tab 152, as explained earlier. Also connectable to slot 132 are an outward-swinging plate 620 and an inward-swinging plate 640, which can be used when the system 600 is used to barricade double outward-swinging doors or double inward-swinging doors respectively. These plates 620 and 640 have tabs 624 and 644 that can connect with slot 132. Outward-swinging plate 620 additionally has tabs 622L and 622R that can connect to door brackets 450, as described further below.

Tab 472 on the upper portion 122 can be connected a slot 456 on a door-connected door bracket 450 to barricade an outward-swinging door, as described earlier (FIG. 14). Tab 472 can also be connected to an insert 160' and to a bumper 610'. This insert 160' and bumper 610' are structurally and functionally similar to the insert 160 and bumper 610 connectable to the tab 132, but different in that they have slots 172' and 614' that connect with the tab 472. In this regard, note that the insert 160' and/or bumper 610' connect by sliding vertically upwards onto the tab 472, not downwards as described earlier. This configuration runs some risk that the insert 160' or bumper 610' can slide away from the upper portion 122 (e.g., by gravity). However, this risk is mitigated because the insert 160' and bumper 610' can as mentioned earlier be formed of plastic or rubber, thus allowing their slots 172' and 614' to connect with the tab 472 via friction. Furthermore, because the bottom of insert 160' or bumper 610' would touch the lip 114 of the receptacle 110 (or the floor 70) when the anchor 120 is inserted into the receptacle, this prevents the insert 160' or bumper 610' from falling away from the upper portion 122.

FIGS. 19A-19D show components of the system 600 that can be used when barricading different types of doors. All examples use the anchor 120, i.e., upper portion 122 and lower portion 124 as screwed together at threads 122*a*/124*a*. Further, all depicted examples can include communication functionality by virtue of the use of insert 160 or insert 160', thus allowing deployment of the system to be monitored. That being said, it is not strictly required that a component-based system such as 600 include communication functionality if not desired. Inserts 160 or 160' are thus not required in all useful examples of system 600. Furthermore, system 600 can include communication and monitoring functionality in other manners that do not require an affixable insert, as discussed earlier with respect to FIG. 13.

Figure 19A:
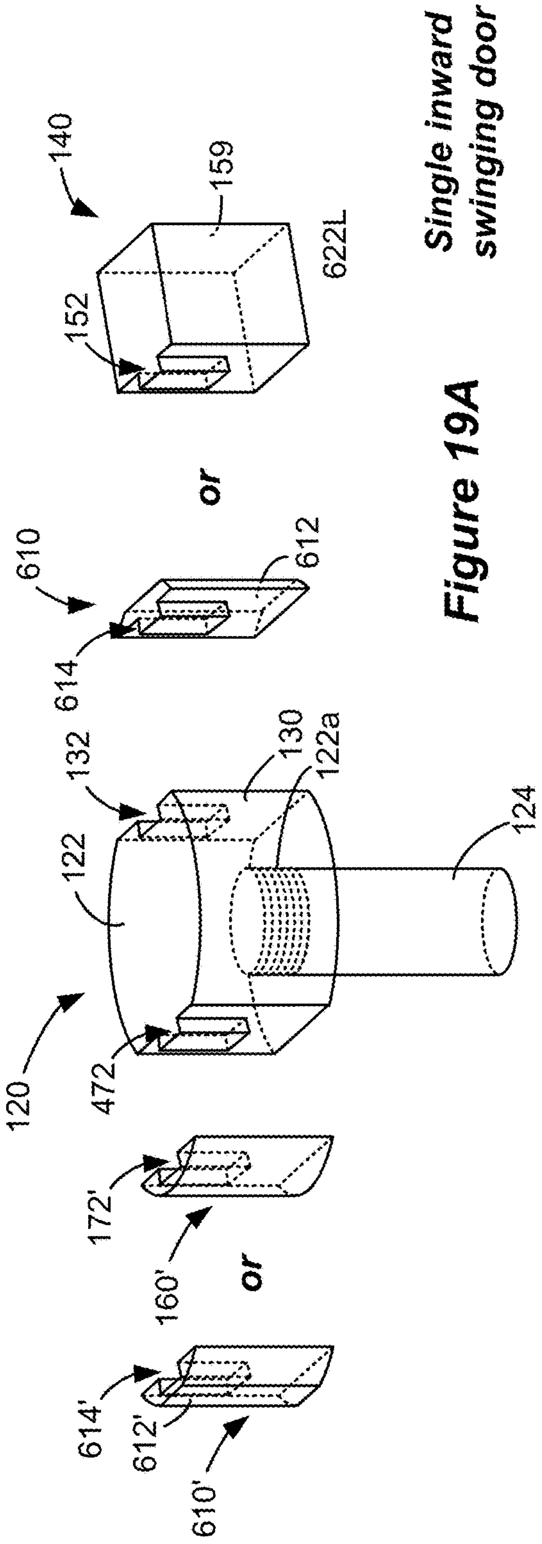
FIGS. 19A-19D respectively show the components of the system of FIG. 18 used when barricading an inward-swinging single door (FIG. 19A), an outward-swinging single door (FIG. 19B), an inward-swinging double door (FIG. 19C), and an outward-swinging double door (FIG. 19D).

FIG. 19A shows components in system 600 that can be used when barricading a single inward-swinging door. In this configuration, the insert 160' can be affixed to the upper portion 122 of the anchor 120 at slot/tab 172'/472. Alternatively, if communication functionality is not needed or desired, bumper 610' can be affixed to the upper portion 122 of the anchor 120 at slot/tab 614'/472. The bumper 610' covers and protects the tab 472, and otherwise provides the upper portion 122 with a more rounded shape, making this configuration less of a trip hazard. Slot 132 on the other side of the anchor 120 can either be connected to the bumper 610 or to the extension 140. As explained earlier (FIGS. 5A & 5B), this allows system 600 to be configured to either barricade the door 10 when it's closed in frame 12 (when the extension 140 is used), or to allow the door to be opened a gap 180 (when bumper 610 is used). Alternatively, the bumper 610 may contact the door 100 when closed in frame 12 (this depends on the distance at which the receptacle 110 is installed with respect to the door). Use of the bumper 610, while preferred, is not strictly necessary, as the door being barricaded can also contact vertical surface 130 directly, rather than the vertical surface 612 of the bumper 610. If a bumper is to be used, another alternative not illustrated would be to use bumper 610' (affixable to tab 472) and insert 160 (affixable to slot 132).

Figure 19B:
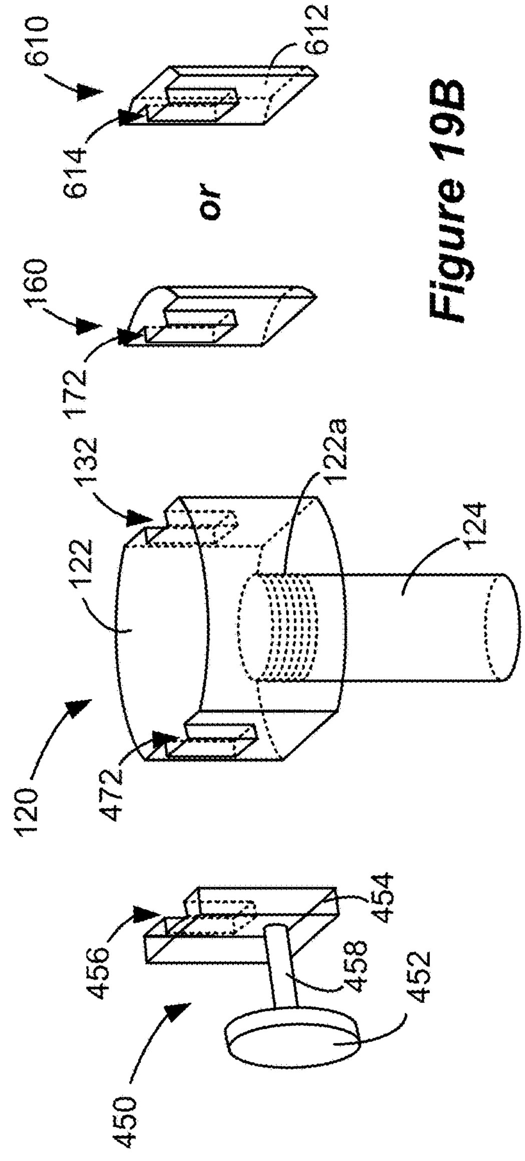

FIG. 19B shows components in system 600 that can be used when barricading a single outward-swinging door. In this configuration, the insert 160 can be affixed to the upper portion 122 of the anchor 120 at slot/tab 132/172. Alternatively, if communication functionality is not needed or desired, bumper 610 can be affixed to the upper portion 122 of the anchor 120 at slot/tab 132/714. The bumper 610 covers and protects the slot 132, and otherwise provides the upper portion 122 with a more rounded shape, making this configuration less of a trip hazard. This configuration also includes use of door bracket 450, which as noted earlier is affixed to the door being barricaded. As described before (FIG. 14-16B), tab 472 on the upper portion connects with slot 456 on the door bracket 450 to barricade the door from swinging outwards.

Figure 19C:
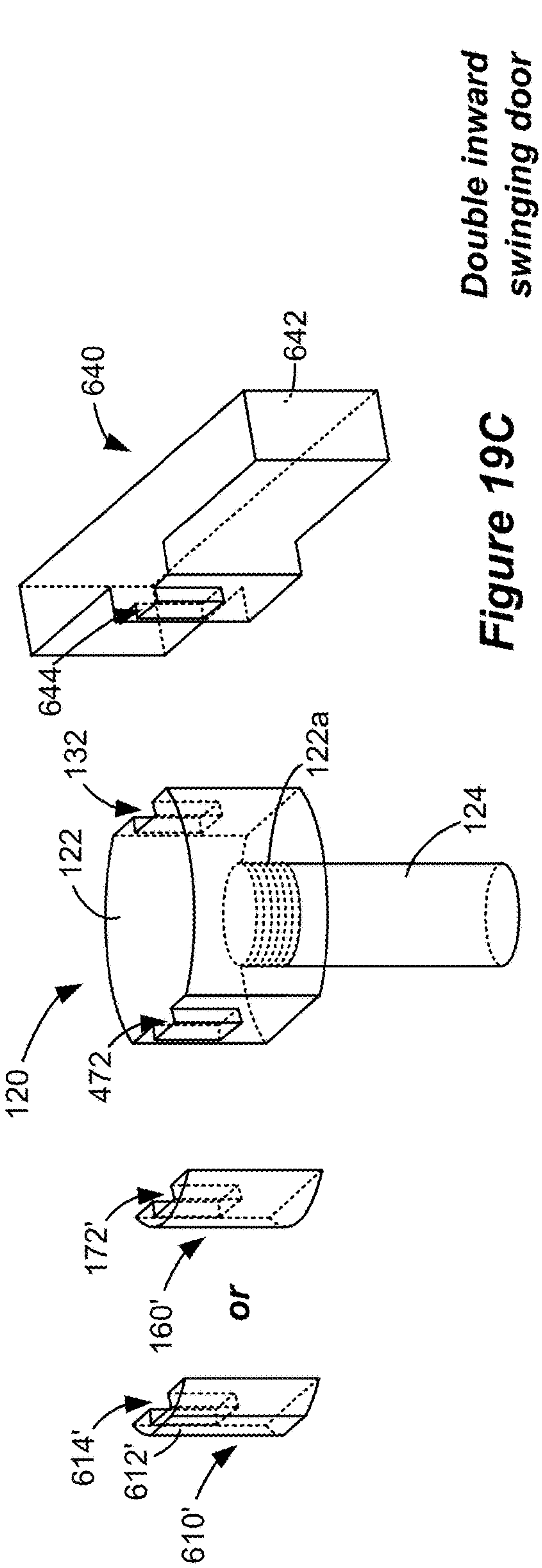

FIG. 19C shows components in system 600 that can be used when barricading a double inward-swinging door. In this configuration, the insert 160' can be affixed to the upper portion 122 of the anchor 120 at slot/tab 172'/472, although as before (FIG. 19A) bumper 610' can also be affixed at slot/tab 614'/472. Slot 132 on the other side of the anchor 120 is affixed to the inward-swinging plate 640 via its tab 644. Vertical surface 642 of the plate 640 will contact the inside surfaces of both doors being barricaded, similar to what was described earlier with respect to FIG. 17A. Although not shown, this vertical surface 642 can include a pad.

Figure 19D:
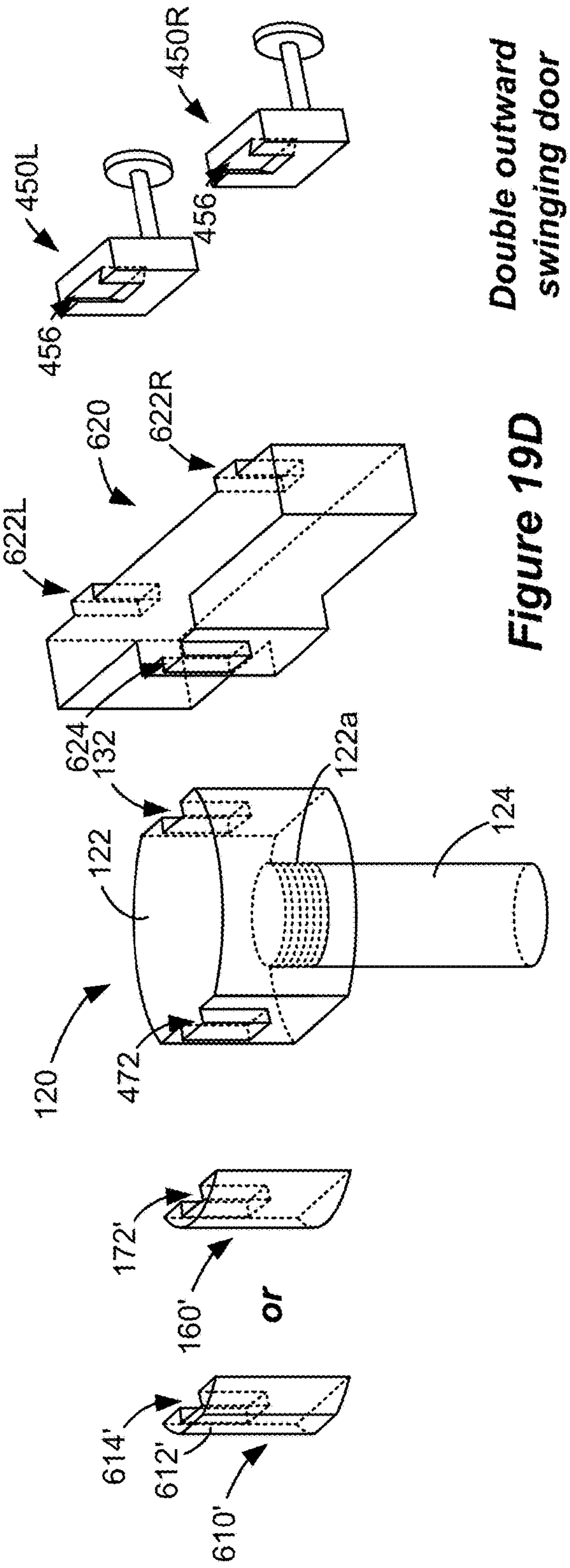

FIG. 19D shows components in system 600 that can be used when barricading a double inward-swinging door. In this configuration, the insert 160' can again be affixed to the upper portion 122 of the anchor 120 at slot/tab 172'/472, although again bumper 610' can also be affixed at slot/tab 614'/472. Slot 132 on the other side of the anchor 120 is affixed to the outward-swinging plate 620 via its tab 624. This configuration also includes use of two door brackets 450L and 450R, which as noted earlier are affixed to the doors 10L and 10R being barricaded, as was shown in FIG. 17B. Tabs 622L and 622R connect with the slots 456 on the door brackets 450 to prevent both doors from swinging outwards.

To summarize, system 600 has the benefit of being fully configurable based upon the components used to barricade inward- and outward-swinging doors, whether they are single doors or double doors.

Components affixable to the upper portion 122 (e.g., extension 140, inserts 150 or 160', bumper 610 or 610', plates 620 or 640) can comprise portion of the upper portion 122 of the anchor 120.

The systems disclosed herein have been described as useful for barricading inward- or outward-swinging doors. However, it should be noted that the disclosed systems can also be used to barricade revolving doors. Because revolving doors rotate in one direction, they can be viewed as being both inward swinging (the rotating-in side) and outward swinging (the rotating-out side). Therefore, systems disclosed herein as being useful to barricade inward-swinging doors or outward-swinging doors can be used with revolving doors, with the appropriate system being used on the appropriate side of the door. Furthermore, revolving doors may be protected by using both inward-swinging and outward-swinging systems on the different sides of the rotating doors.

Although particular embodiments have been shown and described, it should be understood that the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A door barricading system, comprising:

a lower portion configured to be slid into a receptacle mountable in a floor inside at least one door to be barricaded;

an upper portion connected to the lower portion, wherein the upper portion is configured to either (i) contact the at least one door to prevent the at least one door from swinging inwards, or (ii) connect to at least one door bracket affixed to the at least one door to prevent the at least one door from swinging outwards; and an insert removably affixable to the upper portion, wherein the insert includes electronic circuitry configured to wirelessly communicate with a monitoring system.

2. The system of claim 1, wherein the upper portion comprises a first key, and wherein the insert comprises a second key removeable affixable to the first key.

3. The system of claim 1, wherein the second key is removeable affixable to the first key via a vertical sliding motion.

4. The system of claim 3, wherein the first and second key have horizontal bottom edges that are brought into contact by the vertical sliding motion.

5. The system of claim 3, wherein the first and second keys are shaped to prevent horizontal movement of the insert away from the upper portion when the first and second keys are affixed.

6. The system of claim 1, wherein the first key comprises a tab or slot, and wherein the second key comprises the other of the tab or slot.

7. The system of claim 1, wherein the insert comprises a housing for the electronic circuitry comprising a dielectric material.

8. The system of claim 1, wherein the electronic circuitry is configured to wirelessly transmit a message to the monitoring system indicating that the system has been deployed to barricade the at least one door.

9. The system of claim 8, wherein the message is transmitted periodically.

10. The system of claim 8, wherein the message comprises an identification number for the system.

11. The system of claim 8, wherein the insert comprises a switch, wherein the electronic circuitry is configured to transmit the message when the switch is depressed.

12. The system of claim 11, wherein the switch is configured to be depressible by a user upon deploying the system.

13. The system of claim 11, wherein the switch is configured to be automatically depressed when the system is deployed.

14. The system of claim 8, wherein the electronic circuitry is configured to automatically transmit the message when the system is deployed.

15. The system of claim 8, wherein the insert further comprises a visual indicator configured to indicate when the message is being transmitted.

16. The system of claim 1, wherein the electronic circuitry is further configured to receive an alert from the monitoring system.

17. The system of claim 1, wherein the electronic circuitry is configured to wirelessly receive an alert from the monitoring system.

18. The system of claim 1, wherein the upper portion is a cylindrical shape, and wherein the insert comprises a curved surface to match the cylindrical shape when the insert is affixed to the upper portion.

19. The system of claim 1, wherein the upper portion comprises a first portion and an extension removably affixable to the first portion, wherein the extension is configured to contact the at least one door to prevent the at least one door from swinging inwards.

20. The system of claim 1, wherein the upper portion comprises a third key configured to connect to a fourth key on the at least one door bracket.

* * * * *